(12) United States Patent
Liburdi et al.

(10) Patent No.: US 10,953,748 B2
(45) Date of Patent: Mar. 23, 2021

(54) MULTI-LAYER DISPLAY FOR VEHICLE DASH

(71) Applicant: PURE DEPTH LIMITED, Auckland (NZ)

(72) Inventors: Steven A. Liburdi, Grosse Pointe Farms, MI (US); Ronald H. Dybalski, Oxford, MI (US)

(73) Assignee: Pure Depth Limited

( * ) Notice: Subject to any disclaimer, the term of this patent is extended or adjusted under 35 U.S.C. 154(b) by 0 days.

(21) Appl. No.: 15/696,291

(22) Filed: Sep. 6, 2017

(65) Prior Publication Data

US 2018/0065483 A1    Mar. 8, 2018

Related U.S. Application Data

(60) Provisional application No. 62/383,689, filed on Sep. 6, 2016.

(51) Int. Cl.
*B60K 35/00* (2006.01)
*G09G 5/12* (2006.01)
(Continued)

(52) U.S. Cl.
CPC .............. *B60K 35/00* (2013.01); *G02F 1/137* (2013.01); *G02F 1/163* (2013.01); *G06F 3/1423* (2013.01); *G09G 3/003* (2013.01); *G09G 3/3406* (2013.01); *G09G 5/12* (2013.01); *B60K 2370/154* (2019.05); *B60K 2370/20* (2019.05); *B60K 2370/27* (2019.05); *B60K 2370/52* (2019.05); *B60K 2370/695* (2019.05);
(Continued)

(58) Field of Classification Search
CPC ......... B60K 35/00; B60K 37/02; G02F 1/137; G02F 1/163; G06F 3/1423; G09G 3/3406; G09G 5/12
See application file for complete search history.

(56) References Cited

U.S. PATENT DOCUMENTS 6,542,146 B1 * 4/2003 Toffolo .................. B60K 37/02
340/438
9,437,131 B2 * 9/2016 Nagara .................... G09G 3/32
(Continued)

FOREIGN PATENT DOCUMENTS

DE     10 2016 10097    7/2016
WO     WO 98/45668      10/1998
WO     WO 2016/138313   9/2016

OTHER PUBLICATIONS

Extended European Search Report dated Mar. 13, 2020 for EP Application No. 17848237.8.

*Primary Examiner* — Sardis F Azongha
(74) *Attorney, Agent, or Firm* — Craig A. Baldwin

(57) ABSTRACT

Exemplary embodiments of this disclosure provide a display system that integrates a mechanical indicator assembly in an overlapping manner with one or more displays in an instrument panel. An instrument panel may include a mechanical indicator assembly including a pointer configured to rotate about an axis and thereby define an area swept by the pointer, a transparent display, a housing configured to support the mechanical indicator assembly and the transparent display overlaying the mechanical indicator assembly, and a control system configured to display, on the transparent display, content including text and/or graphics.

10 Claims, 18 Drawing Sheets

(51) Int. Cl.
  *G06F 3/14* (2006.01)
  *G09G 3/34* (2006.01)
  *G02F 1/163* (2006.01)
  *G02F 1/137* (2006.01)
  *G09G 3/00* (2006.01)
  *G02F 1/1362* (2006.01)

(52) U.S. Cl.
  CPC ...... *B60K 2370/698* (2019.05); *G02F 1/1362* (2013.01); *G09G 2300/023* (2013.01); *G09G 2380/10* (2013.01)

(56) References Cited

U.S. PATENT DOCUMENTS

| | | | |
|---|---|---|---|
| 9,959,838 B2* | 5/2018 | Nagata | G06F 3/1423 |
| 10,094,687 B2* | 10/2018 | Clochard | B60Q 3/62 |
| 2004/0183656 A1* | 9/2004 | Abel | B60K 35/00 |
| | | | 340/425.5 |
| 2010/0097293 A1* | 4/2010 | McMahon | B60K 35/00 |
| | | | 345/1.1 |
| 2012/0306635 A1 | 12/2012 | Sato | |
| 2013/0174773 A1 | 6/2013 | Nagara et al. | |
| 2014/0000508 A1* | 1/2014 | Liburdi | G01D 13/04 |
| | | | 116/284 |
| 2014/0035942 A1 | 2/2014 | Yun et al. | |
| 2014/0321162 A1 | 10/2014 | Toki et al. | |
| 2015/0328989 A1 | 11/2015 | Ishikawa et al. | |
| 2016/0012630 A1 | 1/2016 | Bell | |
| 2017/0090113 A1* | 3/2017 | Yuki | G02B 6/0088 |
| 2017/0192531 A1* | 7/2017 | Sanchez Lopez | B60K 35/00 |
| 2017/0253178 A1* | 9/2017 | Tane | G09G 3/3611 |

* cited by examiner

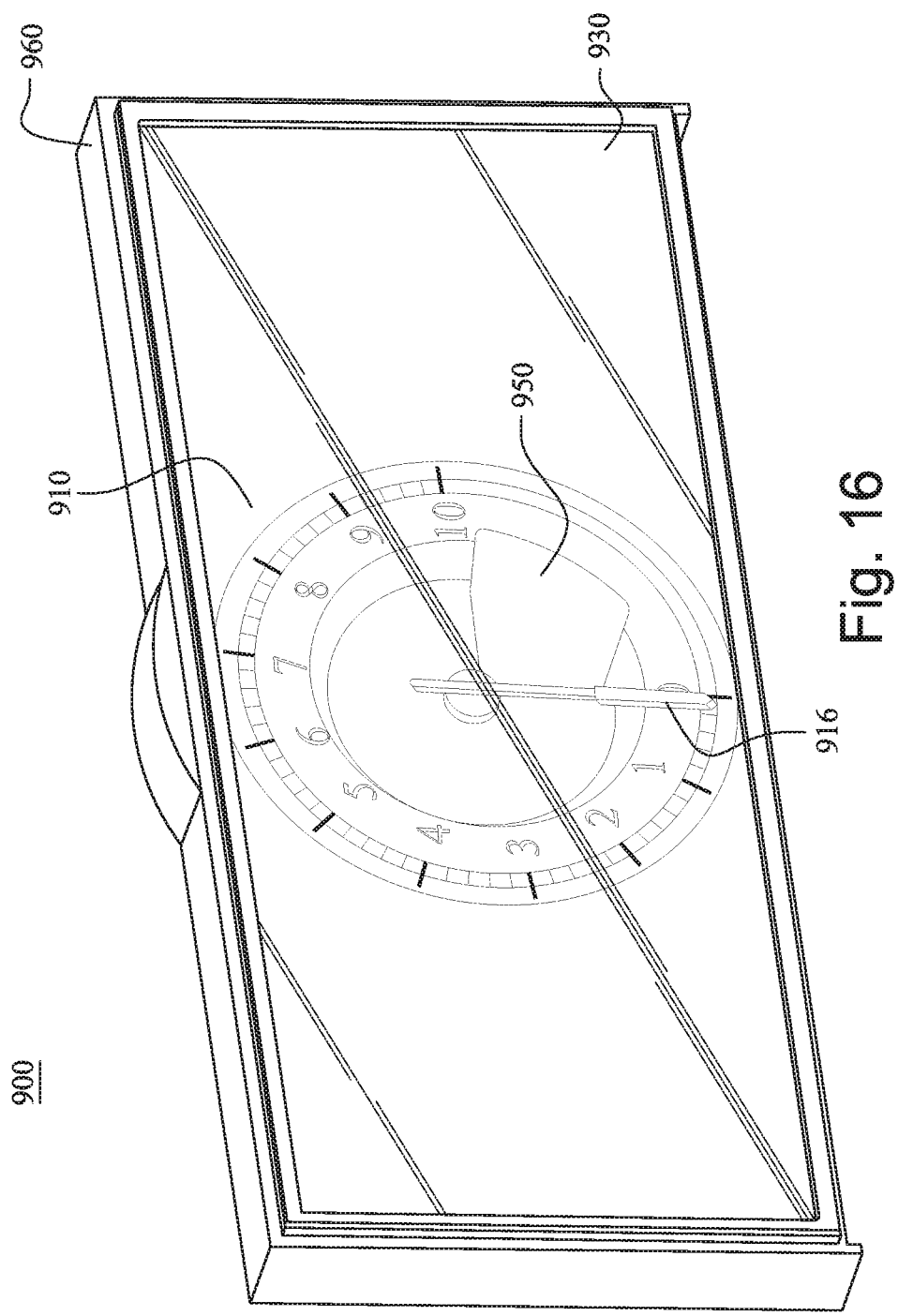

MULTI-LAYER DISPLAY FOR VEHICLE DASH

CROSS REFERENCE TO RELATED APPLICATIONS

This application claims the benefit of priority to U.S. Provisional Patent Application No. 62/383,689 filed on Sep. 6, 2016, the entire contents of which is hereby incorporated by reference.

FIELD OF THE INVENTION

The invention relates generally to displays, and, more particularly, to instrument panels including a mechanical indicator assembly and one or more displays, and methods for indicating information using the mechanical indicator assembly and displaying content on the displays. The one or more displays may include a transparent display and/or a multi-layer display.

BACKGROUND

There has been increased efforts to provide displays that can display objects in three-dimensions. For example, stereo displays convey depth information by displaying offset images that are displayed separately to the left and right eye. When an observer views these planar images they are combined in the brain to give a perception of depth. However, such systems are complex and require increased resolution and processor computation power to provide a realistic perception of the displayed objects.

Multi-component displays including multiple display screens in a stacked arrangement have been developed to display real depth. Each display screen may display its own image to provide visual depth due to the physical displacement of the display screens. For example, multi-display systems are disclosed in U.S. Patent Publication Nos. 2015/0323805 and 2016/0012630, the disclosures of which are both hereby incorporated herein by reference. However, such systems may be too complex and expensive for some applications.

SUMMARY

Exemplary embodiments of this disclosure provide a display system that integrates a mechanical indicator assembly in an overlapping manner with one or more displays in an instrument panel. The mechanical indicator assembly may provide the three dimensional structure that an observer is accustomed to seeing while the one or more displays positioned in front of and/or behind the mechanical indicator assembly may provide additional information to the observer. The one or more displays may digitally display content to enhance the visibility of the mechanical indicator assembly. For example, the one or more displays may display a digital ring around the perimeter or inside of the mechanical indicator assembly, digits, and/or text. In some embodiments, the one or more displays may be controlled to hide at least a portion of the mechanical indicator assembly.

Integration of the mechanical indicator assembly with the one or more displays may allow for information to be displayed to an observer in a three dimensional manner without needing to use complex displays. In addition, embodiments of this disclosure may improve existing displays (e.g., multi-layer displays) used to display information in a three-dimensional manner by incorporating the mechanical indicator assembly as part of the display.

According to one exemplary embodiment, an instrument panel may include a mechanical indicator assembly including a pointer configured to rotate about an axis and thereby define an area swept by the pointer, a transparent display, a housing configured to support the mechanical indicator assembly and the transparent display overlaying the mechanical indicator assembly, and a control system configured to display, on the transparent display, content including text and/or graphics.

In another exemplary embodiment, an instrument panel may include a multi-layer display system including a first display screen and a second display screen arranged in a substantially parallel manner, the first display screen overlapping the second display screen, a mechanical indicator assembly including a pointer configured to rotate about an axis and thereby define an area swept by the pointer, a housing configured to support the mechanical indicator assembly and the multi-layer display system posseted behind the mechanical indicator assembly, and a control system configured to display, on the multi-layer display system, content including text and/or graphics.

In another exemplary embodiment, an instrument panel may include a mechanical indicator assembly including a pointer configured to rotate about an axis and thereby define an area swept by the pointer, a transparent display, an electrochromatic (EC) glass layer disposed between the mechanical indicator assembly and the transparent display, and a control system configured to (1) display, on the transparent display, content including text and/or graphics and (2) control light transmission properties of the EC glass layer.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

FIG. 16 illustrates an instrument panel according to another embodiment of the present disclosure.

DETAILED DESCRIPTION

Certain example embodiments of the instant invention provide solution(s) that reduce the complexity and cost of systems used to display content with a three-dimensional depth in a digital display. Example include integration of mechanical devices having a tree-dimensional depth with one or more digital displays.

Figure 1:
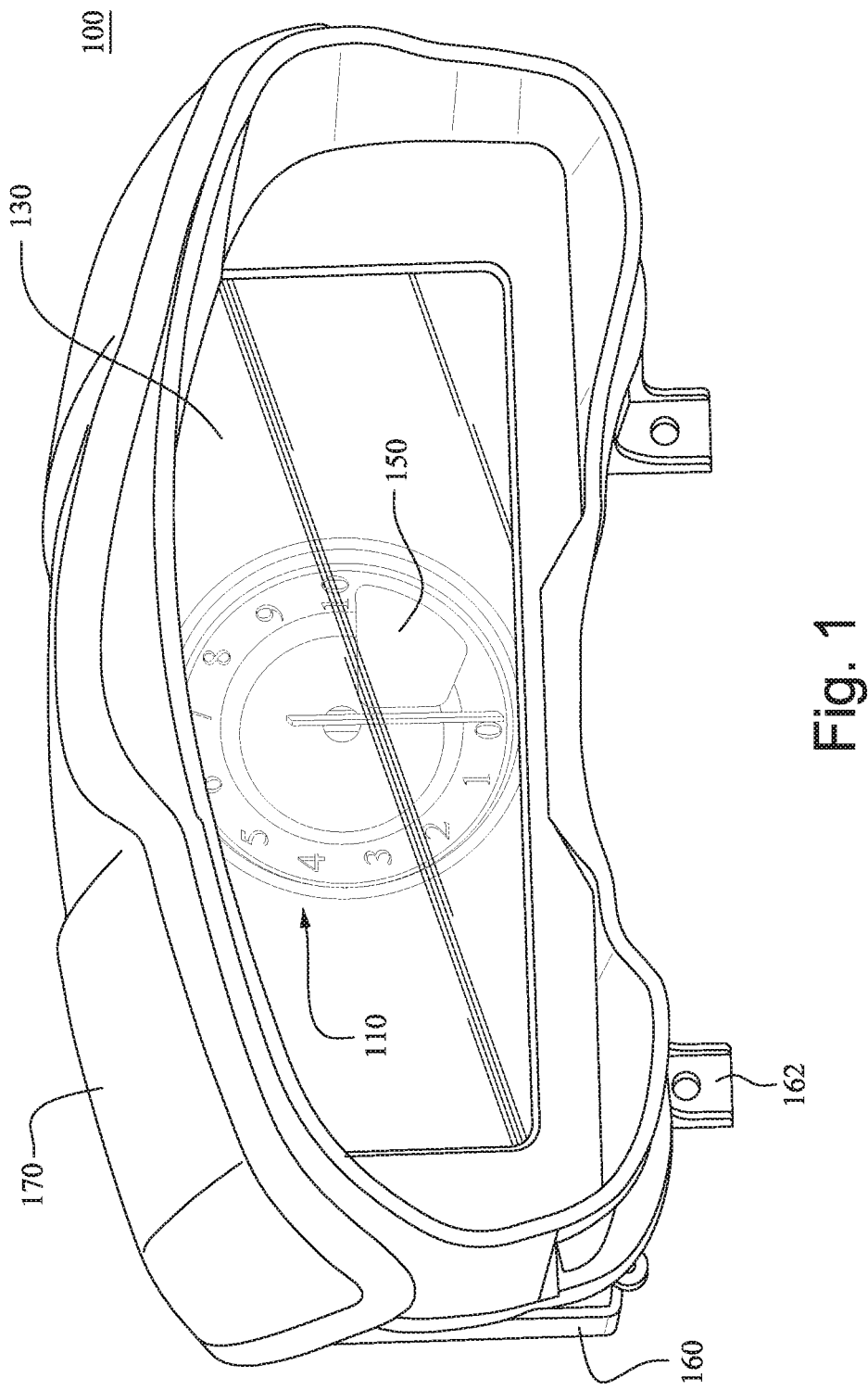
FIGS. 1-3 illustrate an instrument panel according to an embodiment of the present disclosure.
Figure 2:
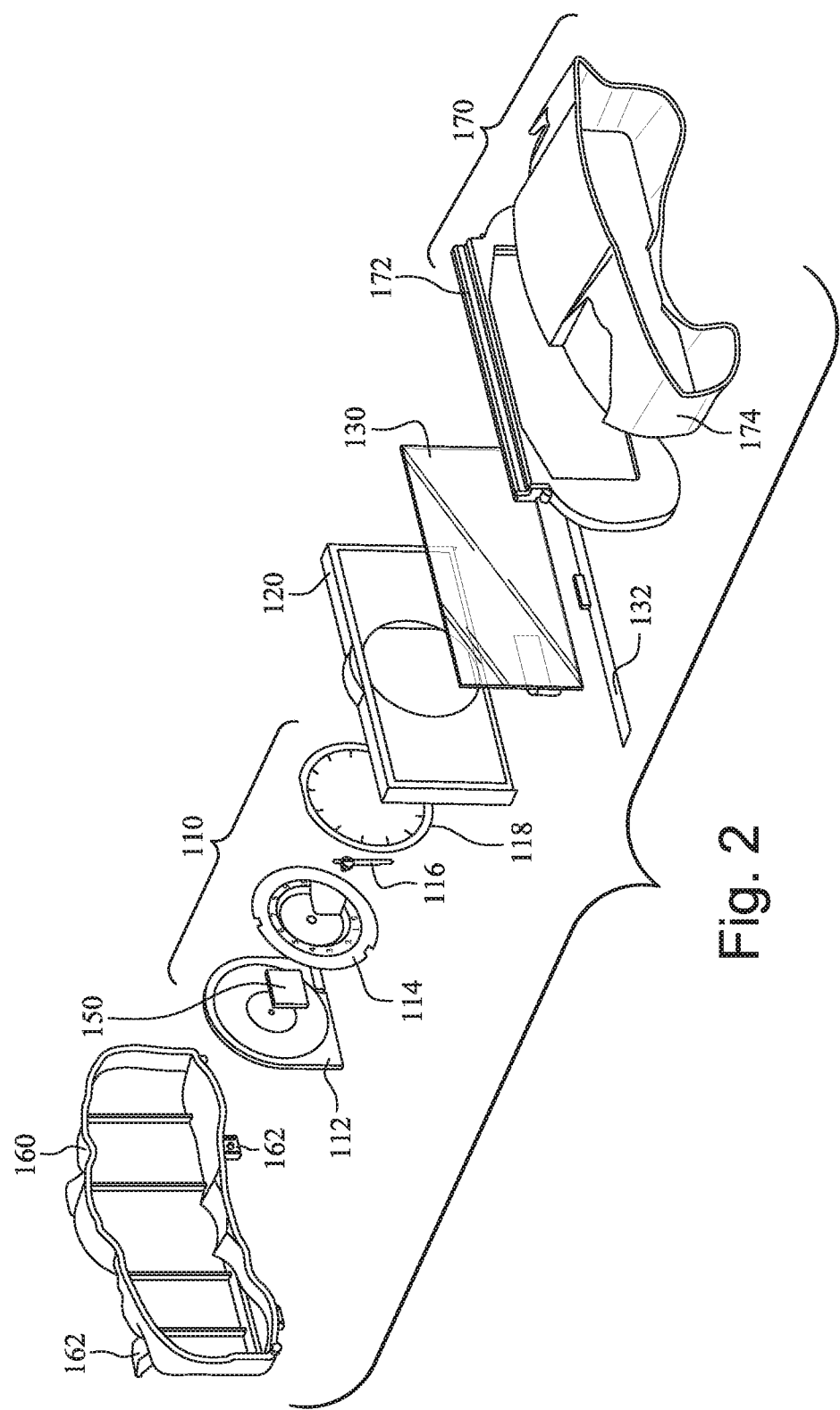
Figure 3:
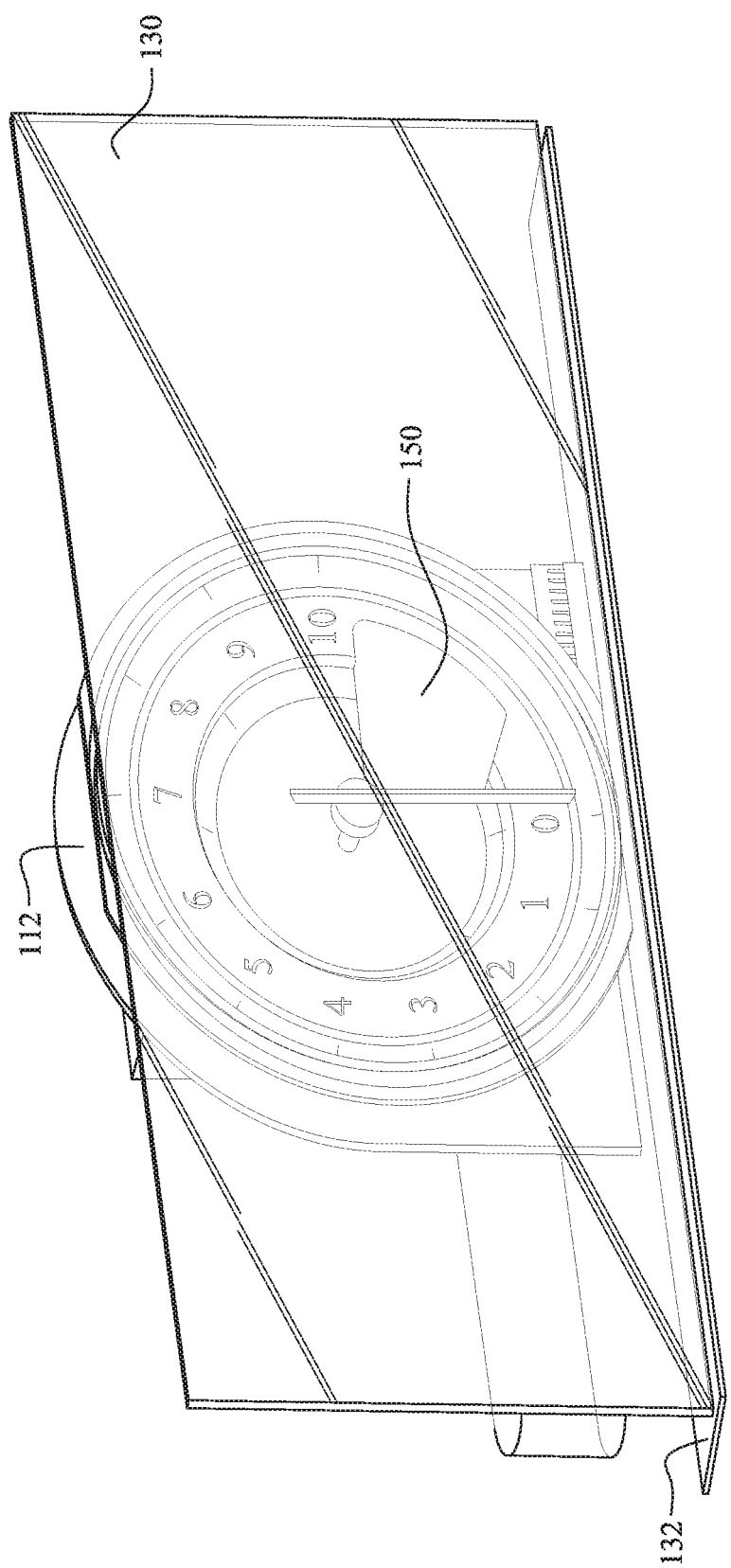

FIGS. 1-3 illustrate an instrument panel 100 according to an embodiment of the present disclosure. The instrument panel 100 may be installed in a dashboard of a vehicle. The instrument panel 100 may be configured to display information to an occupant of the vehicle via one or more displays and one or more mechanical indicators provided in the instrument panel 100. The displayed information may include vehicle speed, engine coolant temperature, oil pressure, fuel level, charge level, and navigation information, but is not so limited.

As illustrated in FIGS. 1-3, the instrument panel 100 may include a mechanical indicator assembly 110, a formed layer 120, and/or a transparent display 130. The indicator assembly 110 may be provided partially or completely within the formed layer 120. The transparent display 130 may be positioned such that it is overlapping the indicator assembly 110 and the formed layer 120. As illustrated in FIG. 2, the transparent display 130 may abut the outer edges of the formed layer 120.

The instrument panel 100 may also include a first housing 160 and second housing 170. The first housing 160 and the second housing 170 may be configured to detachably engage and to enclose the indicator assembly 110, formed layer 120, and/or the transparent display 130. The first housing 160 may include a plurality of attachment features 162, such as mounting tabs or other connectors known in the art for securing the instrument panel 100 to the vehicle.

The indicator assembly 110 may include a mechanical structure including a movable component configured to respond to signals received from a processor and/or sensors directly or via a processor. The indicator assembly 110 may be a needle indicator assembly including a back panel 112, an information layer 114, a pointer 116, and a bezel layer 118. The back panel 112 may be printed circuit board (PCB) including a connector for coupling to another connector provided in the housing 160 or outside of the housing 160. The PCB may include circuitry for controlling position of the pointer 116 relative to the information provided on the information layer 114.

The information layer 114 may include information such as numerals on a front surface. The information may be printed on the front surface or attached by other means.

The pointer 116 may overlay the information layer 114. The pointer 116 may be configured to rotate about an axis. The pointer 116 may rotate between a first position and a second position, different from the first position, responsive to received signals. The rotational position of the pointer 116 may be controlled by controlling a motor (e.g., a stepper motor) or other means known to a person of ordinary skill in the art. In one embodiment, the pointer 116 may be a magnetized pointer rotationally positioned using electromagnets arranged around a perimeter or periphery of the indicator assembly 110. The motor may be a rear mounted to the back panel 112.

The bezel layer 118 may include a back surface that abuts the information layer 114 and a three dimensional front structure that extends toward the transparent display 130. At least a portion of the three dimensional front structure of the bezel layer 118 (e.g., outside perimeter) may abut the transparent display 130.

The formed layer 120 may be a three-dimensional (3D) formed graphic printed layer including one or more openings for at least a portion of the indicator assembly 110 to be viewed through. At least one of the openings of the formed layer 120 may correspond to the shape of the information layer 114 and/or the bezel layer 118. In FIG. 2, the formed layer 120 is illustrated with flat surfaces on each side of the opening, but it is not so limited. In some embodiments, the formed layer 120 may include one or more curved surfaces and/or three dimensional features. At least a portion of the indicator assembly 110 may extend through and past the formed layer 120 (e.g., the pointer 116 and/or the bezel layer 118).

The transparent display 130 may be an LCD display (e.g., LCD with TFT technology) or LED display (inorganic or an organic LED display) configured to display content in color. As illustrated in FIG. 2, an edge light PCB 132 for lighting the transparent display 130 may be provided on at least one edge of the transparent display 130. The edge light may eliminate the need for a backlight being provided behind the transparent display. The transparent display 130 may use other technologies, such as OLED, to eliminate the need for a backlight.

The transparent display 130 may allow a user to see what is displayed on the transparent display 130 while still being able to see what is positioned and/or displayed on other displays behind the transparent display 130. The transparent display 130 may be configured to display text, images, and/or video content that is overlays physical object or other display screen(s) positioned behind the transparent display 130.

The transparent display 130 may be controlled to be clear or opaque. Thus, the transparent display 130 may hide the physical objects or other display screen(s) positioned behind the transparent display 130 or allow them to be viewable via the transparent display 130. In one embodiment, the transparent display 130 may be turned off to allow the physical objects and/or other display screens to be viewable, and may be turned on to reduce the visibility of the physical objects and/or other display screens behind the transparent display 130.

In some embodiments, content displayed on the transparent display 130 may determine what portion of the transparent display 130 is clear and what portion of the transparent display 130 is opaque. In this embodiment, certain physical objects and/or certain portions of one or more displays behind the transparent display 130 may be hidden while other physical object and/or certain portions of one or more displays behind the transparent display 130 may be visible. OLED technology may be utilized to display black or dark content on the transparent display 130 where the transparent display 130 needs to be clear and to display white or bright content on the transparent display 130 where the transparent display 130 need to be opaque.

Because ambient light can affect the appearance of transparency, an instrument panel hood 174 may help to reduce the amount of ambient light that reaches the transparent display 130. The instrument panel hood 174 may be provided adjacent to a front housing cover 172. The front housing cover 172 may include an opening for viewing the transparent display 130 and be configured to engage and hold the transparent display 130 in place against the formed layer 120. The front housing cover 172 may optionally include a protective transparent material to cover the transparent display 130 and/or reduce glare from ambient light.

As illustrated in FIGS. 1-3, a second display 150 may be provided behind the transparent display 130. The display 150 may be used to display additional information such as a numeral value of the speed, navigation information, and/or warning. The information displayed on the display 150 may be viewed via the transparent display 130. In some embodiments, the display 150 may display information that corresponds to the information provided by the indicator assembly 110. For example, the pointed 116 in the indicator assembly 110 may be controlled to point to a numeral on the information layer 114 that approximately corresponds to the vehicle's current speed and the display 150 may display a numeral value of the vehicle's current speed.

In FIG. 2, the display 150 is illustrated as being provided as part of the indicator assembly 110 and mounted to a front surface of the back panel 112, but is not so limited. The display 150 may be provided in other locations of the instrument panel 100 behind the transparent display 130. In FIG. 2, the display is viewable via an opening provided in the information layer 114.

The display 150 may include a liquid crystal display (LCD) matrix. Alternatively, the display 150 may include organic light emitting diode (OLED) displays, transparent light emitting diode (TOLED) displays, cathode ray tube (CRT) displays, field emission displays (FEDs), field sequential display or projection displays. In one embodiment, the display 150 may be combinations of either full color RGB, RGBW or monochrome panels. The display 150 is not limited to the listed display technologies and may include other display technologies that allows for the projection of light. In one embodiment, the light may be provided by a projection type system including a light source and one or more lenses and/or a transmissive or reflective LCD matrix. The display 150 may include a multi-layer display unit including multiple stacked or overlapped display layers each configured to render display elements thereon for viewing through the uppermost display layer.

In one embodiment, the display 150 may be smaller in size as compared to the transparent display 130 and have a planar surface that is parallel or substantially parallel to the transparent display 130.

Figure 4:
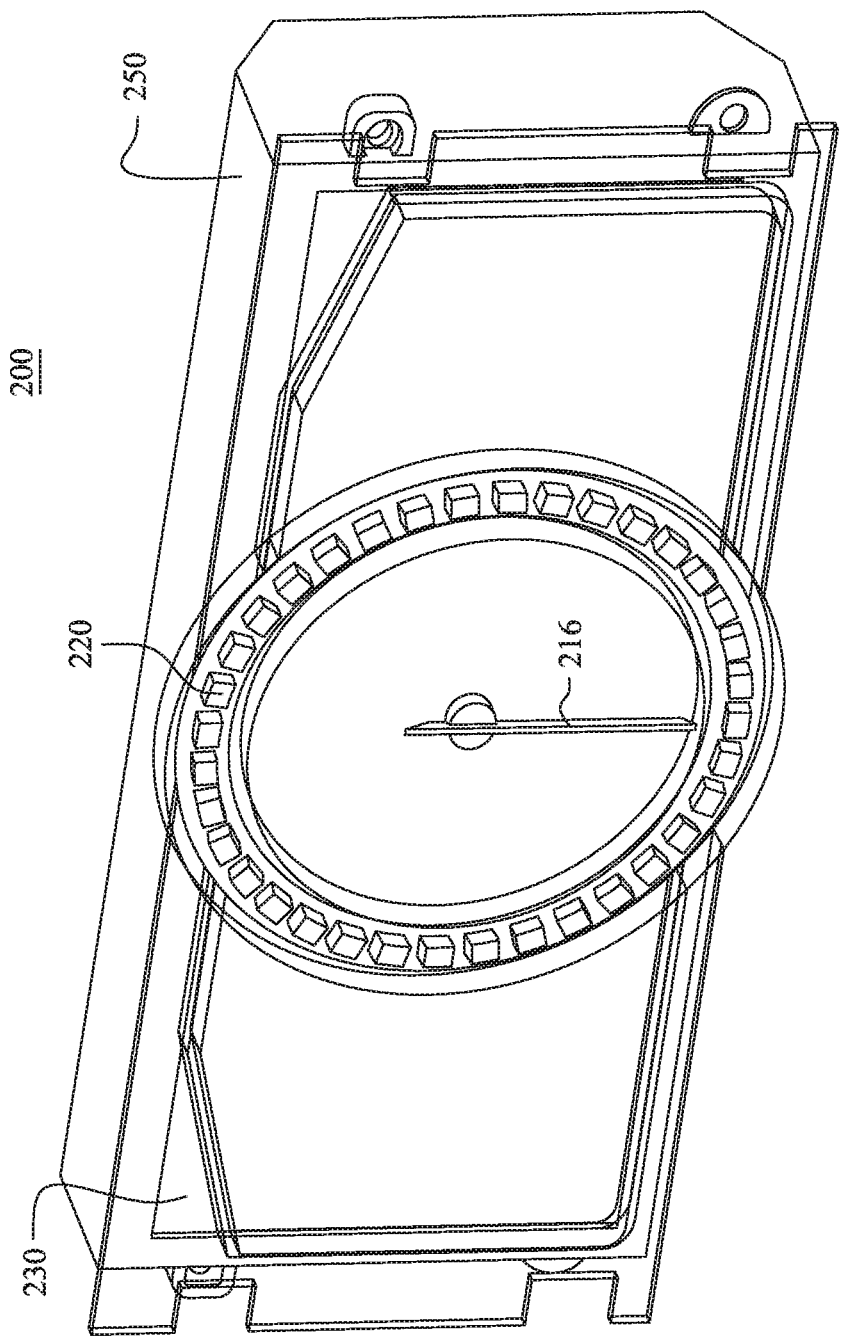
FIGS. 4 and 5 illustrate components of an instrument panel according to another embodiment of the present disclosure.
Figure 5:
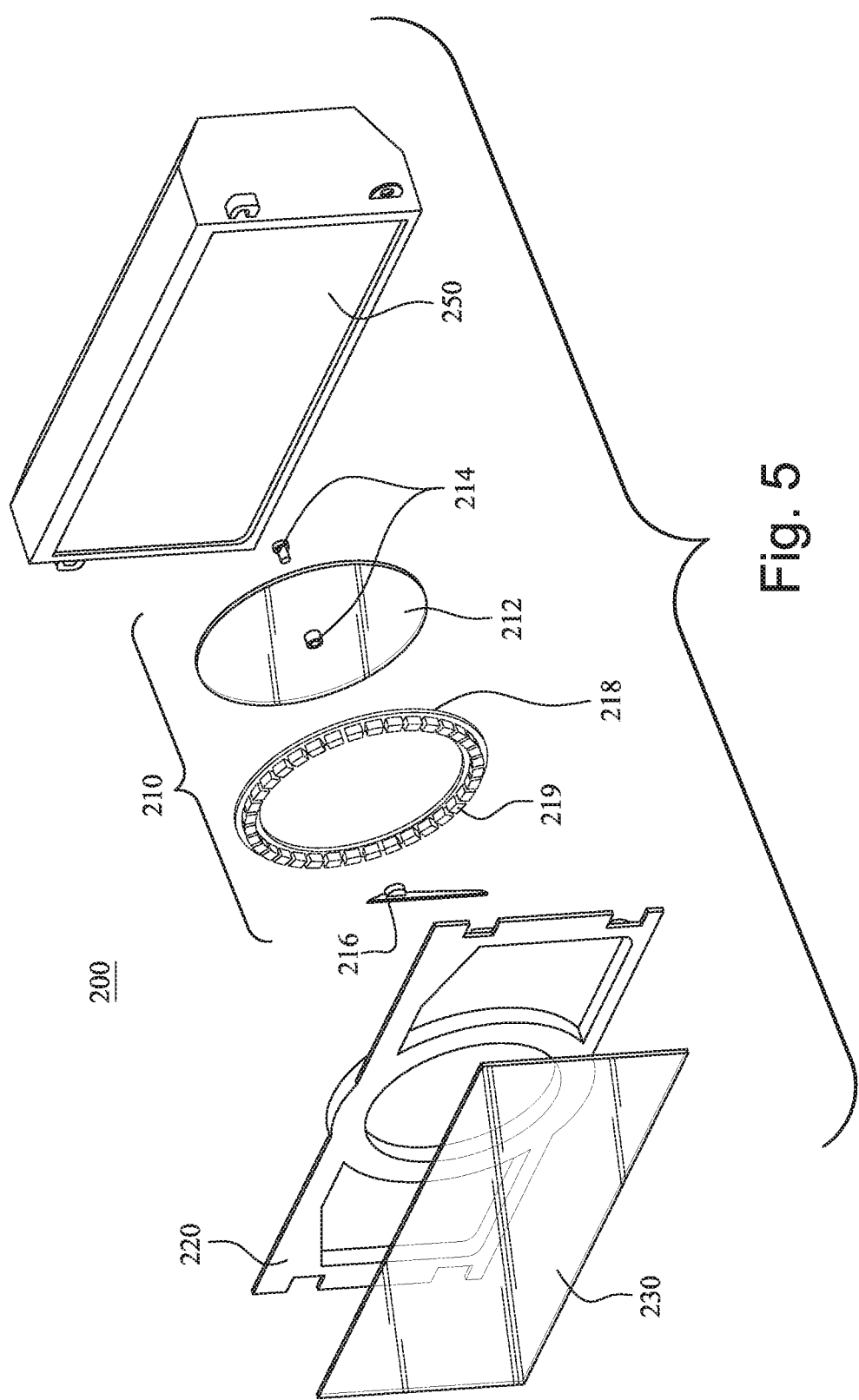

FIGS. 4 and 5 illustrate components of an instrument panel 200 according to another embodiment of the present disclosure. The instrument panel 200 may include a mechanical indicator assembly 210, a formed layer 220, and/or a transparent display 230. The instrument panel may further include a multi-layer display unit 250. The components of the instrument panel 200 may be provided in a common housing (not illustrated in FIGS. 4 and 5).

The mechanical indicator assembly 210 may overlay a front display of the multi-layer display unit 250. The indicator assembly 210 may be provided at least partially within the formed layer 220. The transparent display 230 may be positioned such that it is overlapping the indicator assembly 210 and the formed layer 220. The transparent display 230 may abut a portion (e.g., the outer edges) of the formed layer 220.

The indicator assembly 210 may include a mechanical structure including a movable component configured to respond to signals received from a processor and/or sensors directly or via a processor. The indicator assembly 210 may be a needle indicator oriented by periphery electromagnets disclosed in U.S. Patent Application Publication 2014/0000508, which is incorporated herein by reference.

As illustrated in FIGS. 4 and 5, the indicator assembly 210 may include a back panel 212, with may be a clear lens. A retainer 214 may be disposed at the center of the back panel 212 for rotationally supporting a pointer 216. The pointer 216 may be a magnetized pointer overlaying the multi-layer display 250. The pointer 216 may be configured to rotate about an axis, and so defines an area swept by the pointer.

The pointer 216 may be characterized as magnetized as it may be entirely, or partially, formed of magnetic material. For example, the magnetic material may be material suitable for making permanent magnets, or other ferromagnetic material such as iron. The pointer 216 may be formed entirely or partially of a permanent magnet, or material that can be temporarily magnetized in the presence of a magnetic field. If only a tip portion of the pointer 216 is formed of magnetic material, for example a permanent magnet, the remaining portion of the pointer 216 may be formed of a polymeric compound. The pointer 216 is formed partially or entirely of magnetic material so that the pointer 216 itself is urged to some particular orientation by a magnetic field in order to point in a desired direction. This configuration advantageously avoids the more traditional configuration of having a separate permanent magnet coupled to the pointer by a shaft on the axis, and an electromagnet proximate to the separate permanent magnet, as these parts would undesirable obscure the view of the display 250 proximate the pointer 216.

In order to generate a suitable magnetic field to orient the pointer 216 in the desired direction, the indicator assembly 210 may include a plurality of electromagnets 219 arranged around a perimeter of a ring 218. By way of example and not limitation, the electromagnets 219 may be a coil of wire wound on an iron bobbin, and attached to a printed circuit board or other suitable substrate. Alternatively, the coil of wire may be wound on a bobbin formed of polymeric material. It should be recognized that each of the electromagnets 219 may include two conductive leads (not shown) coupled to an H-bridge circuit (not shown) so that a positive, negative, or zero current can be established in each of the electromagnets 219 and thereby generate a NORTH magnetic field, a SOUTH magnetic field, or a null or OFF magnetic field. It should also be recognized that the strength or intensity of the magnetic field is generally proportional to the magnitude of current flowing in an electromagnet. As is known in the art, the magnitude of current may be controlled by pulse-width-modulation of the signal applied to the electromagnets 219. Accordingly, the electromagnets 219 are operable to urge the pointer 216 to point in a desired direction.

In one embodiment, the electromagnets 219 are oriented so that when a positive current is applied, a NORTH magnetic field is projected towards the center of the ring 218, and a SOUTH magnetic field is projected away from the center of the ring 218. If only one of the electromagnets 219 is energized, then the pointer 216 will be urged to a particular orientation. If an adjacent electromagnet is energized, then the pointer can be incrementally positioned away from the particular orientation. It should be apparent that by energizing combinations of the electromagnets 219 that the pointer can be incrementally positioned to any orientation, and is not limited to being positioned at only a number of distinct orientations corresponding to the number of the electromagnets 219.

The formed layer 220 may be a three-dimensional (3D) formed graphic printed layer including one or more openings for at least a portion of the indicator assembly 210 and/or portion of the display 250 to be viewed through. In some embodiments, the formed layer 220 may include one or more curved surfaces and/or three dimensional features. At least a portion of the indicator assembly 210 (e.g., the pointer 216) may extend through and/or past the formed layer 220.

In one embodiment, the back surface of the formed layer 220 may include a channel for housing a portion of the indicator assembly 210. For example, the back panel 212 may abut the back surface of the formed layer 220 and the ring 218 and/or the electromagnets 219 may be provided inside of the formed layer channel.

The transparent display 230 may be an LCD display (e.g., LCD with TFT technology) or LED display (inorganic or an organic LED display). The transparent display 230 may allow a user to see what is displayed on the transparent display 230 while still being able to see what is positioned and/or displayed on the display 250 behind the transparent display 230. The transparent display 230 may be configured to display text, images, and/or video content that is overlays physical object or other display screen(s) positioned behind the transparent display 230.

The transparent display 230 may be controlled to be clear or opaque. Thus, the transparent display 230 may hide the physical objects or other display screen(s) positioned behind the transparent display 230 or allow them to be viewable via the transparent display 230. In one embodiment, the transparent display may be turned off to allow the physical objects and/or other display screens to be viewable, and may be turned on to reduce the visibility of the physical objects and/or other display screens behind the transparent display 230.

The multi-layer display unit 250 may include a light source (e.g., rear mounted light source, side mounted light source, optionally with a light guide), and/or a plurality of display screens. The display screens may be disposed substantially parallel or parallel to each other and/or a surface (e.g., light guide) of the light source in an overlapping manner.

The multi-layer display unit 250 may display content to a viewer/observer by displaying information on one, two, three, or more of the display screens simultaneously. The multi-layer display unit 250 may display content that interacts with the mechanical indicator assembly 210. For example, the multi-layer display unit 250 may display numerals in an outside portion of the clear back panel 212 and the mechanical indicator assembly 210 may be controlled to position the pointer 216 to one of the displayed numerals. Each of the display screen may be controlled to display different content.

Each of the display panels/screens in the multi-layer display unit 250 may include a liquid crystal display (LCD) matrix. Alternatively, the display screens may include organic light emitting diode (OLED) displays, transparent light emitting diode (TOLED) displays, cathode ray tube (CRT) displays, field emission displays (FEDs), field sequential display or projection displays. In one embodiment, the display panels may be combinations of either full color RGB, RGBW or monochrome panels. The display screens are not limited to the listed display technologies and may include other display technologies that allows for the projection of light. In one embodiment, the light may be provided by a projection type system including a light source and one or more lenses and/or a transmissive or reflective LCD matrix.

In one embodiment, each of the display screens of the multi-layer display unit 250 may be approximately the same size and have a planar surface that is parallel or substantially parallel to one another. In another embodiment, one or more of the display screens may have a curved surface. In one embodiment, one or more of the display screens may be displaced from the other display screens such that a portion of the display screen is not overlapped and/or is not overlapping another display screen.

Each of the display screens in the multi-layer display unit 250 may be displaced an equal distance from each other in example embodiments. In another embodiment, the display screens may be provided at different distances from each other. For example, a second display screen may be displaced from the first display screen a first distance, and a third display screen may be displaced from the second display screen a second distance that is greater than the first distance. The fourth display screen may be displaced from the third display screen a third distance that is equal to the first distance, equal to the second distance, or different from the first and second distances. In a vehicle display panel, the display screens may be displaced 5 mm to 15 mm from each other. In a mobile application, the display screens may be displaced 0.5 mm to 5 mm from each other.

The display screens may be configured to display content with color. The content may include visual display of objects and/or texts. In one embodiment, the content may include displaying images or a sequence of images to provide video or animations. In one embodiment, displaying the content may include moving objects and/or text across the screen or changing or providing animations to the objects and/or text. The animations may include changing the color, shape and/or size of the objects or text. Displayed objects and/or text may be moved between the display screens.

Each of the display screens may be configured to receive data and display, based on the data, a different image on each of the display screens simultaneously. Because the images are separated by a physical separation due to the separation of the display screens of the multi-layer display unit 250, each image is provided at a different focal plane and depth is perceived by an observer in the displayed images. The images may include graphics in different portions of the respective display screen.

Figure 6:
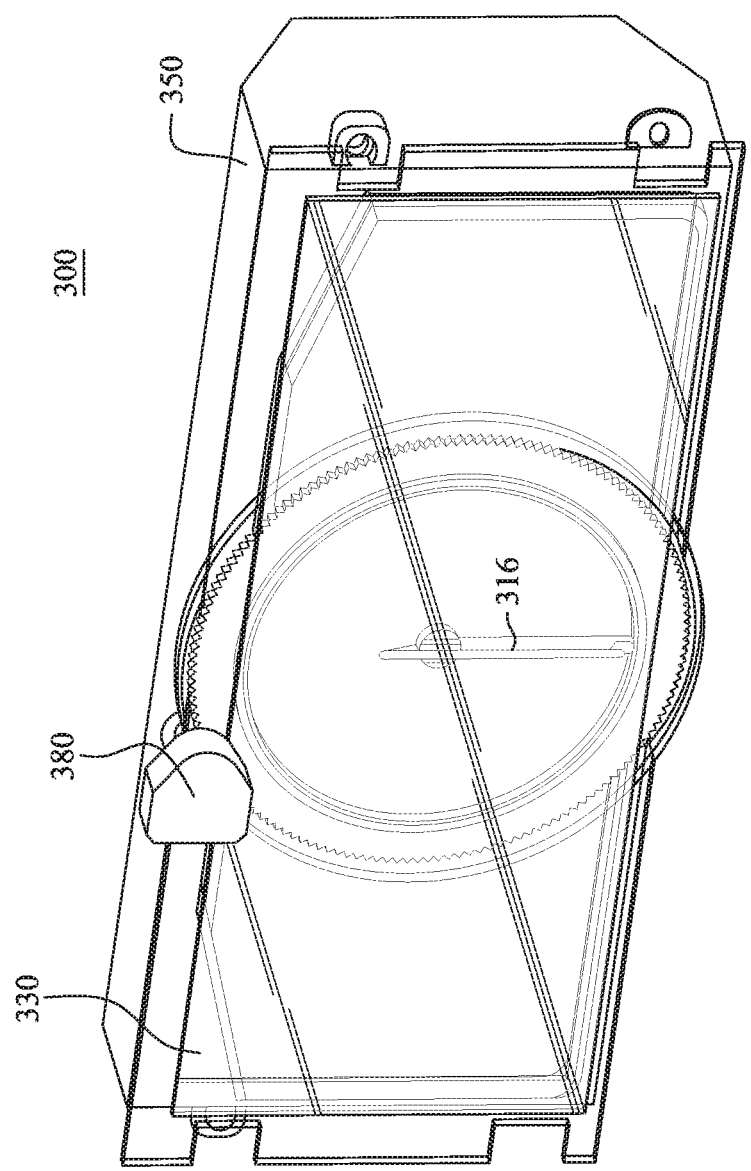
FIGS. 6 and 7 illustrate components of an instrument panel according to another embodiment of the present disclosure.
Figure 7:
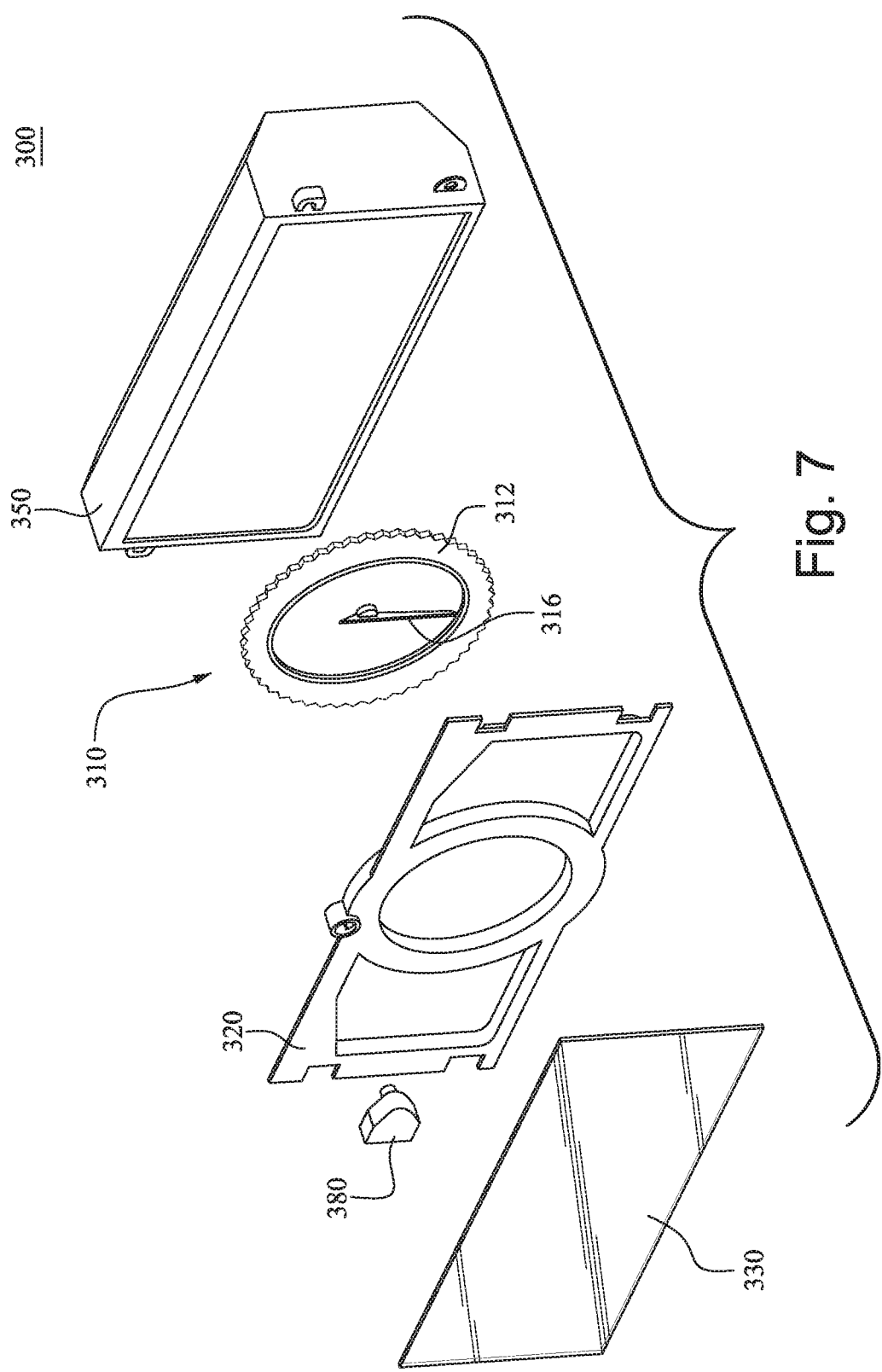

FIGS. 6 and 7 illustrate components of an instrument panel 300 according to another embodiment of the present disclosure. The instrument panel 300 may include a mechanical indicator assembly 310, a formed layer 320, and/or a transparent display 330. The instrument panel may further include a multi-layer display unit 350. The components of the instrument panel 300 may be provided in a common housing (not illustrated in FIGS. 6 and 7).

The mechanical indicator assembly 310 may overlay a front display of the multi-layer display unit 350. The indicator assembly 310 may be provided at least partially within the formed layer 320. The transparent display 330 may be positioned such that it is overlapping the indicator assembly 310 and the formed layer 320. The transparent display 330 may abut a portion (e.g., the outer edges) of the formed layer 320.

The indicator assembly 310 may include a mechanical structure including a movable component configured to respond to signals received from a processor and/or sensors directly or via a processor. As illustrated in FIGS. 6 and 7, the indicator assembly 310 may include an integral ring 312 and pointer 316. The ring 312 may include gear teeth provided on the outside periphery of the ring 312. The ring gear teeth may engage a drive gear coupled to a motor 380 to rotate the ring 312. The pointer 316 may rotate with the rotation of the ring 312 due to the rotation of the drive gear. Content may be displayed in a portion of the multi-layer display unit 350 corresponding to the inside portion of the ring 312.

The formed layer 320 may be a three-dimensional (3D) formed graphic printed layer including one or more openings for at least a portion of the indicator assembly 310 and/or portion of the display 350 to be viewed through. In some embodiments, the formed layer 320 may include one or more curved surfaces and/or three dimensional features. At least a portion of the indicator assembly 310 (e.g., the pointer 316) may extend through and/or past the formed layer 320.

In one embodiment, the back surface of the formed layer 320 may include a channel for housing a portion of the indicator assembly 310. For example, the ring 312 may be disposed at least partially inside of the formed layer 320. The gears on the ring 312 may mesh with the gear of the motor 380 inside of the channel. At least a portion of the formed layer 320 back surface may abut against the display 350.

As illustrated in FIG. 6, the motor 380 may be mounted in front of the transparent displayed 330, but it is not so limited. For example, in some embodiment, the motor 380 may be mounted behind the formed layer 320 and/or the display 350. The motor 380 may be a high speed and torque stepper motor with a drive gear configured to engage the teeth on the ring 312.

The transparent display 330 may be an LCD display (e.g., LCD with TFT technology) or LED display (inorganic or an organic LED display). The transparent display 330 may allow a user to see what is displayed on the transparent display 330 while still being able to see what is positioned and/or displayed on the display 350 behind the transparent display 330. The transparent display 330 may be configured to display text, images, and/or video content that is overlays physical object or other display screen(s) positioned behind the transparent display 330.

The transparent display 330 may be controlled to be clear or opaque. Thus, the transparent display 330 may hide the physical objects or other display screen(s) positioned behind the transparent display 330 or allow them to be viewable via the transparent display 330. In one embodiment, the transparent display may be turned off to allow the physical objects and/or other display screens to be viewable, and may be turned on to reduce the visibility of the physical objects and/or other display screens behind the transparent display 330.

The multi-layer display unit 350 may include a light source (e.g., rear mounted light source, side mounted light source, optionally with a light guide), and/or a plurality of display screens. The display screens may be disposed substantially parallel or parallel to each other and/or a surface (e.g., light guide) of the light source in an overlapping manner.

The multi-layer display unit 350 may display content to a viewer/observer by displaying information on one, two, three, or more of the display screens simultaneously. The multi-layer display unit 350 may display content that interacts with the mechanical indicator assembly 310. For example, the multi-layer display unit 350 may display numerals in portion of the display corresponding to the position inside of the integrated ring 312 with gears and the mechanical indicator assembly 310 may be controlled to position the pointer 316 to one of the displayed numerals. Each of the display screen in the multi-layer display unit 350 may be controlled to display different content.

Figure 8:
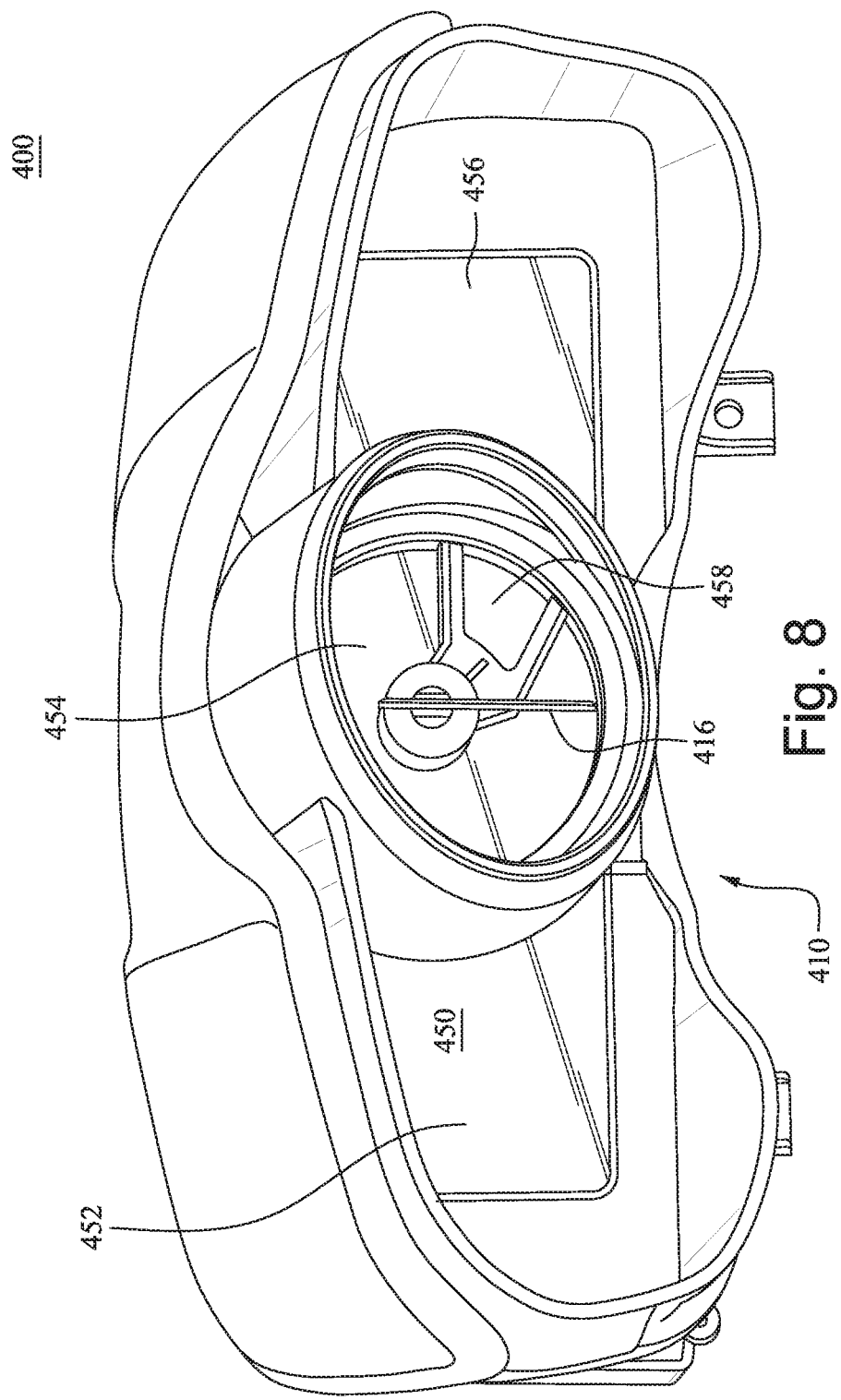
FIG. 8 illustrates components of an instrument panel according to another embodiment of the present disclosure.

FIG. 8 illustrates components of an instrument panel 400 according to another embodiment of the present disclosure. The instrument panel 400 may include a display 450 and a mechanical indicator assembly 410 provided in front of a surface of the display 450. The display 450 may be multi-layer display unit including a plurality of display screens. The mechanical indicator assembly 410 may be provided in front of a front surface of the multi-layer display unit.

As illustrated in FIG. 8, the mechanical indicator assembly 410 may include a pointer and may extend in a direction away from the front surface of the display 450. The physical structure of the mechanical indicator assembly 410 may separate the display 450 into a plurality of regions: a first display region 452 provided on one side of the mechanical indicator assembly 410, a second display region 454 provided inside of a portion of the mechanical indicator assembly 410, and a third display region 456 provided on an opposite side of the mechanical indicator assembly 410. A fourth display region 458 may be provide inside of the mechanical indicator assembly 410.

The mechanical indicator assembly 410 may be a mechanical tachometer or speedometer. Values corresponding to the mechanical indicator assembly 410 may be displayed in the second display region 454 and a pointer 416 may be controlled such that the pointer 416 is positioned relative to appropriate displayed numerals.

Figure 9:
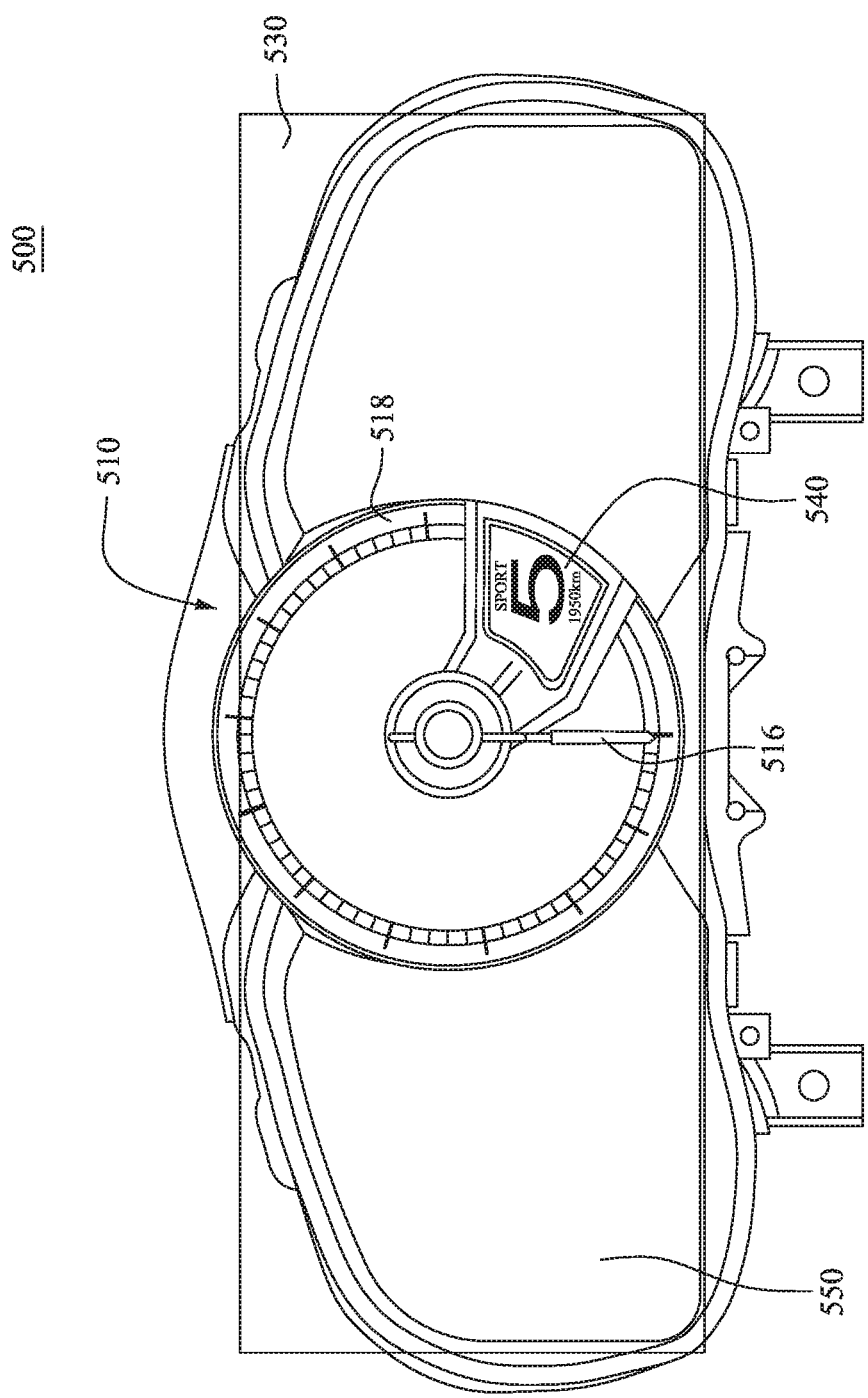
FIGS. 9 and 10 illustrate components of an instrument panel according to another embodiment of the present disclosure.
Figure 10:
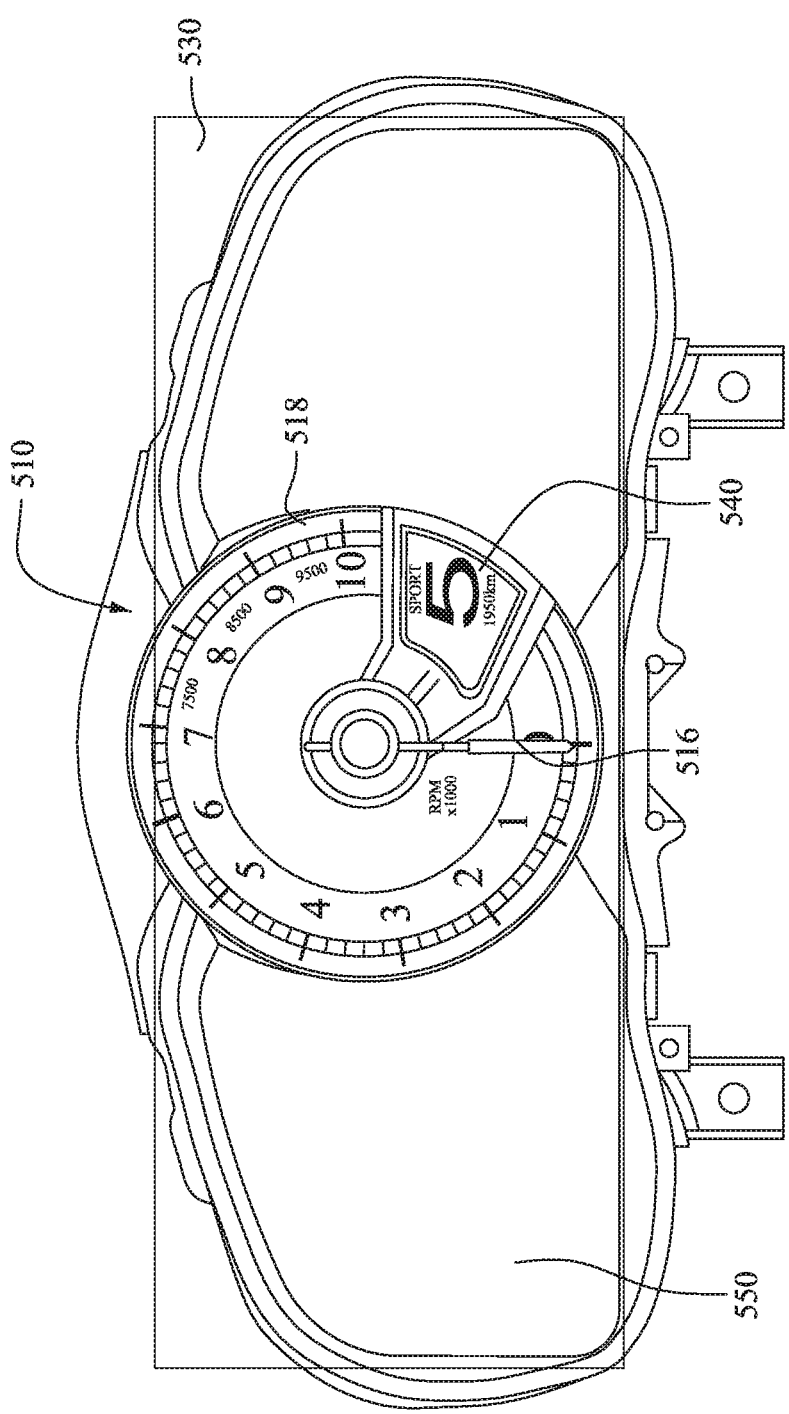

FIGS. 9 and 10 illustrate components of an instrument panel 500 according to another embodiment of the present disclosure. The instrument panel 500 may include an indicator 510 that includes both mechanical and digitally displayed components. A transparent display 530 may be provided in front of the indicator 510 and a multi-layer display 550 may be provided behind the indicator 510. A third display 540 may be provided in a portion of the indicator 510.

Mechanical components of the indicator 510 may include a pointer 516 and a bezel 518 (e.g., a metal bezel) defining the outside perimeter of the indicator 510. The digitally displayed components of the indicator 510 may include numerals, indicator graphics, and/or other vehicle operational information. The digitally displayed component of the indicator 510 may be all displayed on the multi-layer display 550 behind the indicator 510. Other content may also be displayed on the multi-layer display 550 (e.g., outside of the perimeter of the bezel 518).

FIG. 9 illustrates the digitally displayed components of the indicator 510 not being visible. FIG. 10 illustrates the digitally displayed components of the indicator 510 being displayed. The digitally displayed components of the indicator 510 may not be visible due to the digitally displayed components of the indicator 510 not being displayed on the display 550 or due to the transparent display 530 being controlled to partially or completely hide the content displayed on one or more other displays behind the transparent display 530.

As illustrated in FIGS. 9 and 10, content displayed on the third display 540 may be displayed and viewable regardless of whether other content (e.g., digitally displayed components of the indicator 510) is intended to be viable or not. The content displayed on the third display 540 may be displayed due to portion of the transparent display 530 corresponding to the third display 540 being controlled to be clear or due to intensity of the content and or lighting provided to the third display 540.

Figure 11:
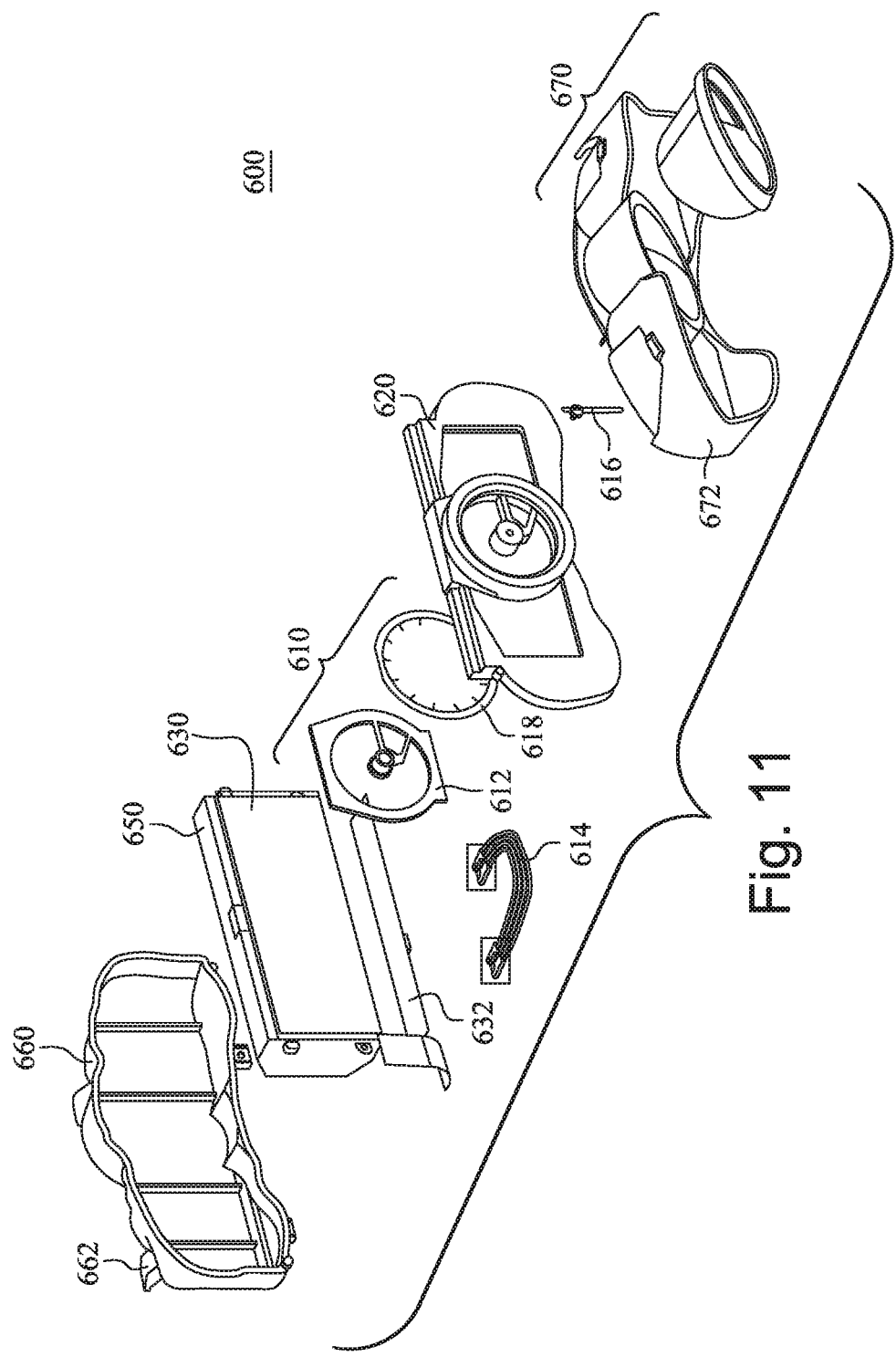
FIGS. 11 and 12 illustrate an instrument panel according to another embodiment of the present disclosure.
Figure 12:
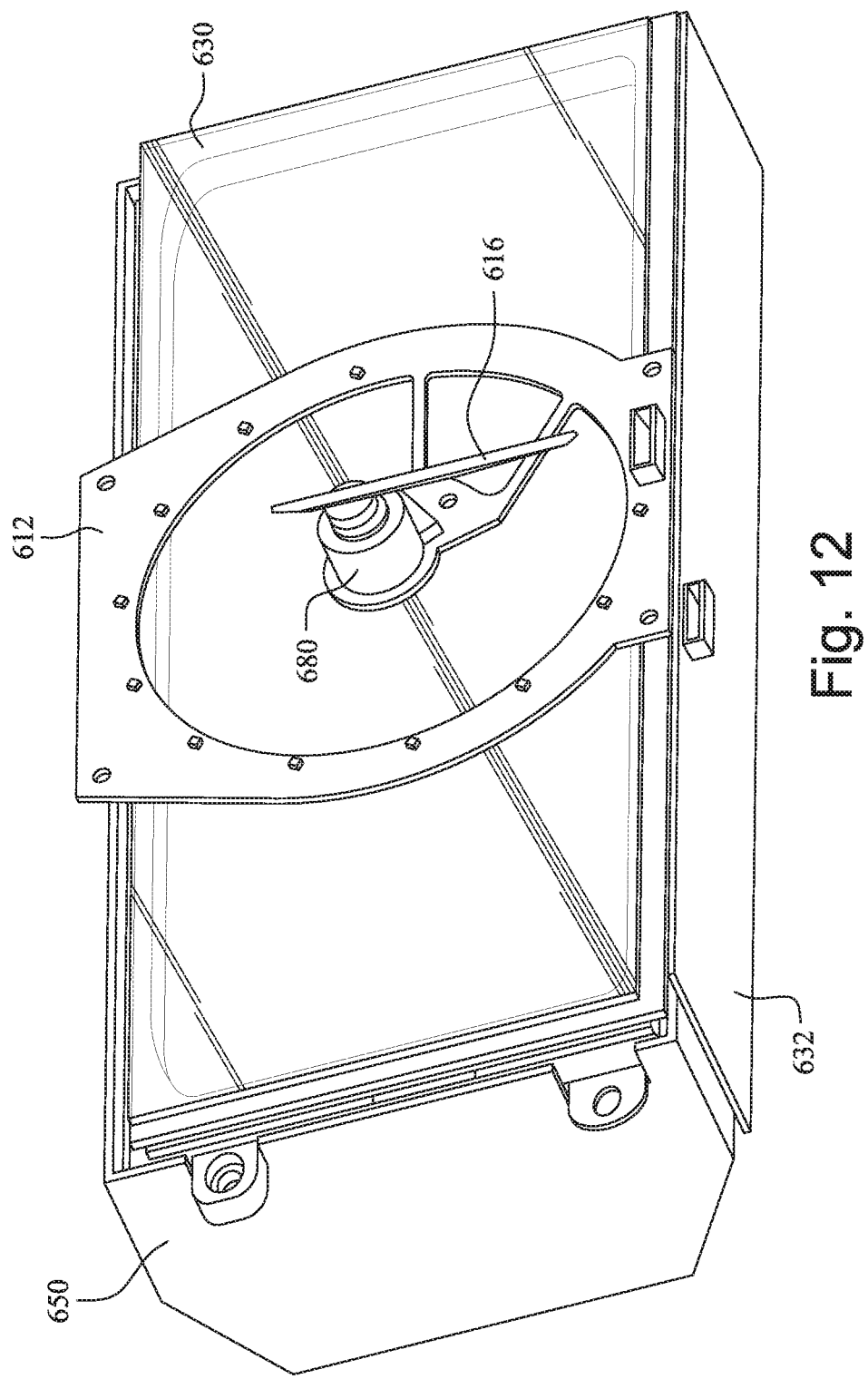

FIGS. 11 and 12 illustrate an instrument panel 600 according to another embodiment of the present disclosure. The instrument panel 600 may be installed in a dashboard of a vehicle. The instrument panel 600 may be configured to display information to an occupant of the vehicle via one or more displays and one or more mechanical indicators provided in the instrument panel 600. The one or more mechanical indicators may be provided in front of a transparent display and/or a multi-layer display. The information displayed on the transparent display and/or the multi-layer display may include vehicle speed, engine coolant temperature, oil pressure, fuel level, charge level, and navigation information, but is not so limited.

As illustrated in FIGS. 11 and 12, the instrument panel 600 may include an indicator assembly 610, a formed layer 620, a transparent display 630, and/or a multi-layer display 650. The indicator assembly 610 may be provided partially or completely within the formed layer 620. In one embodiment, a portion of the indicator 610 (e.g., a back panel 612) may be provided on one side of the formed layer 620 and a portion of the indicator 610 (e.g., a pointer 616) may be provided on an opposite side of the formed layer 620. The transparent display 630 may be positioned such that it is behind the indicator assembly 610 and the formed layer 620. As illustrated in FIGS. 11 and 12, the transparent display 630 may be adjacent to and/or abut the front of the display 650.

The instrument panel 600 may also include a first housing 660 and second housing 670. The first housing 660 and the second housing 670 may be configured to detachably engage and to enclose the indicator assembly 610, formed layer 620, the transparent display 630, and multi-layer display 650. The first housing 650 may include a plurality of attachment features 662, such as mounting tabs or other connectors known in the art for securing the instrument panel 600 to the vehicle.

The indicator assembly 610 may include a mechanical structure including a movable component configured to respond to signals received from a processor and/or sensors directly or via a processor. The indicator assembly 610 may include a back panel 612, a stepper motor 680 mounted to a front surface of the back panel 612, a bezel layer 618 attached to the front surface of the back panel 612, and a pointer 616. The back panel 612 may be printed circuit board (PCB) including a connector for engaging another connector provided in the housing 660 or outside of the housing 660. The PCB may include circuitry for controlling position of the pointer 616 relative to the information displayed on the transparent display 630 and/or the multi-layer display 650.

The pointer 616 may be configured to rotate about an axis between a first position and a second position, different from the first position. The rotational position of the pointer 616 may be controlled by controlling a motor 680 (e.g., a stepper motor) or other means known to a person of ordinary skill in the art. As illustrated in FIGS. 11 and 12, the motor may be a top mounted stepper motor mounted to a front surface of the pack panel 612. The thickness of the formed layer 620 may correspond to the length of the motor 680.

The bezel layer 618 may include a back surface that abuts the back panel 612 and a three dimensional front structure that extends toward the front of the instrument panel 600.

The formed layer 620 may be a three-dimensional (3D) formed graphic printed layer including one or more openings for at least a portion of the indicator assembly 610 to be viewed through. At least one of the openings of the formed layer 620 may correspond to the shape of the bezel layer 618. At least a portion of the indicator assembly 610 may extend through and past the formed layer 620 (e.g., the pointer 616).

The transparent display 630 may be an LCD display (e.g., LCD with TFT technology) or LED display (inorganic or an organic LED display). An edge light PCB 632 for lighting the transparent display 630 may be provided on at least one edge of the transparent display 630. The edge light 632 may eliminate the need for a backlight being provided behind the transparent display. The Transparent display 630 may use other technologies, such as OLED, to eliminate the need for a backlight. The edge light 632 may include one or more connectors for connecting component of the indicator assembly 610 and for connecting to other circuitry within and outside of the housing 660. A connector strip 614 may be used to connect the edge light 632 to the component of the indicator assembly 610 and/or other circuitry.

The transparent display 630 may be configured to display text, images, and/or video content that overlays physical object or other display screen(s) positioned behind the transparent display 630. The transparent display 630 may display numerals for the indicator assembly 610, outlines for physical components (e.g., bezel layer 618) of the indicator assembly 610. Further, the transparent display 610 may be controlled to be clear or opaque.

The front housing 670 may include an instrument panel hood 672 to help to reduce the amount of ambient light that reaches the displays housed inside the instrument panel 600. The instrument panel hood 672 may be provided adjacent to a formed layer 620. The front housing cover 670 may include a plurality of openings for viewing different portions of the transparent display 630 and/or the multi-layer display 650.

The multi-layer display 650 may include a light source (e.g., rear mounted light source, side mounted light source, optionally with a light guide), and/or a plurality of display screens. The display screens may be disposed substantially parallel or parallel to each other and/or a surface (e.g., light guide) of the light source in an overlapping manner.

The multi-layer display unit 650 may display content to a viewer/observer by displaying information on one, two, three, or more of the display screens simultaneously. The multi-layer display unit 650 may display content that interacts with the mechanical indicator assembly 610. For example, the multi-layer display unit 650 may display numerals in portion of the display corresponding to the position of the mechanical indicator assembly 610 and the motor 680 may be controlled to position the pointer 616 to one of the displayed numerals. Each of the display screen in the multi-layer display unit 650 may be controlled to display different content.

Figure 13:
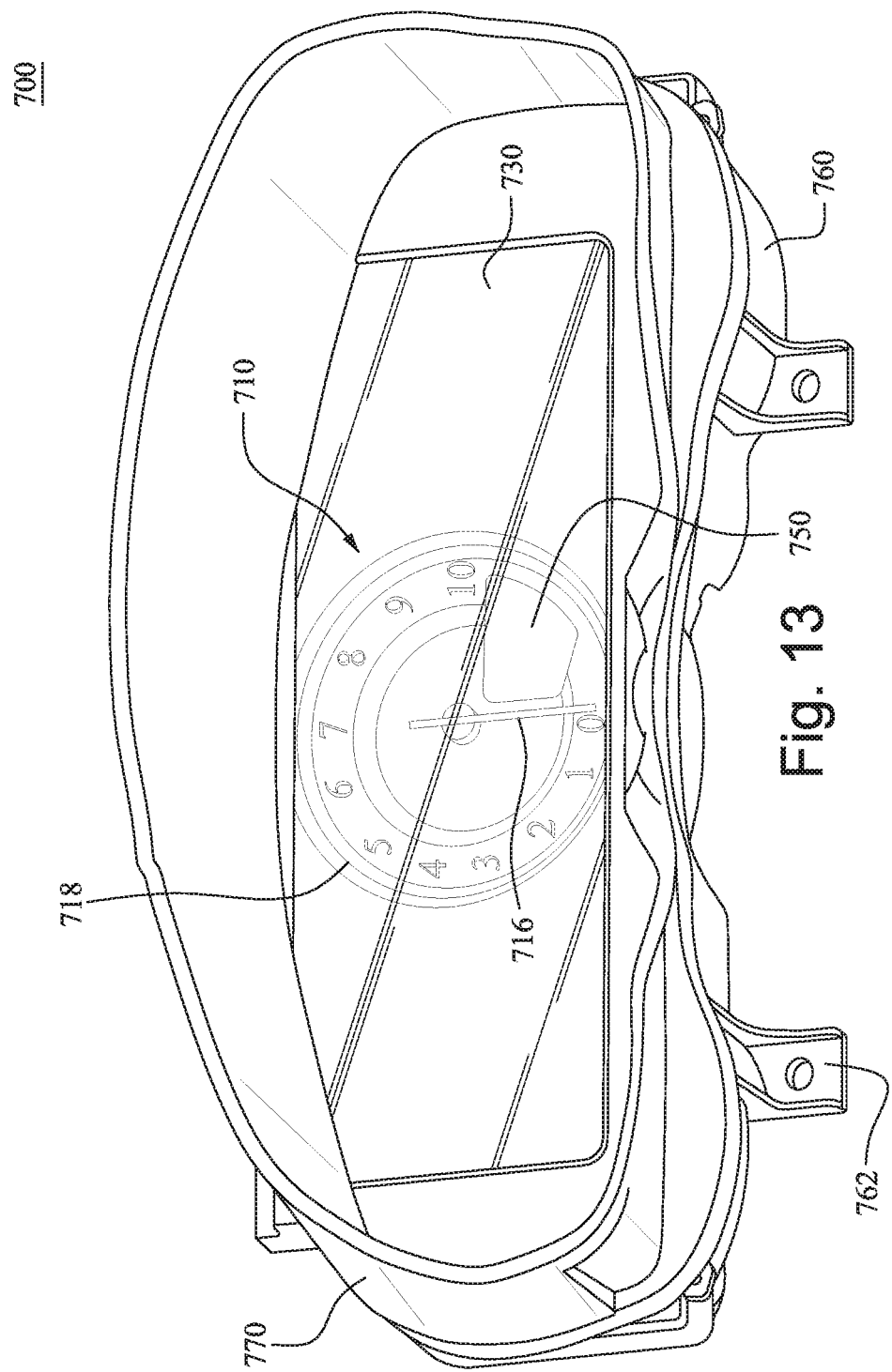
FIGS. 13 and 14 illustrate an instrument panel according to another embodiment of the present disclosure.
Figure 14:
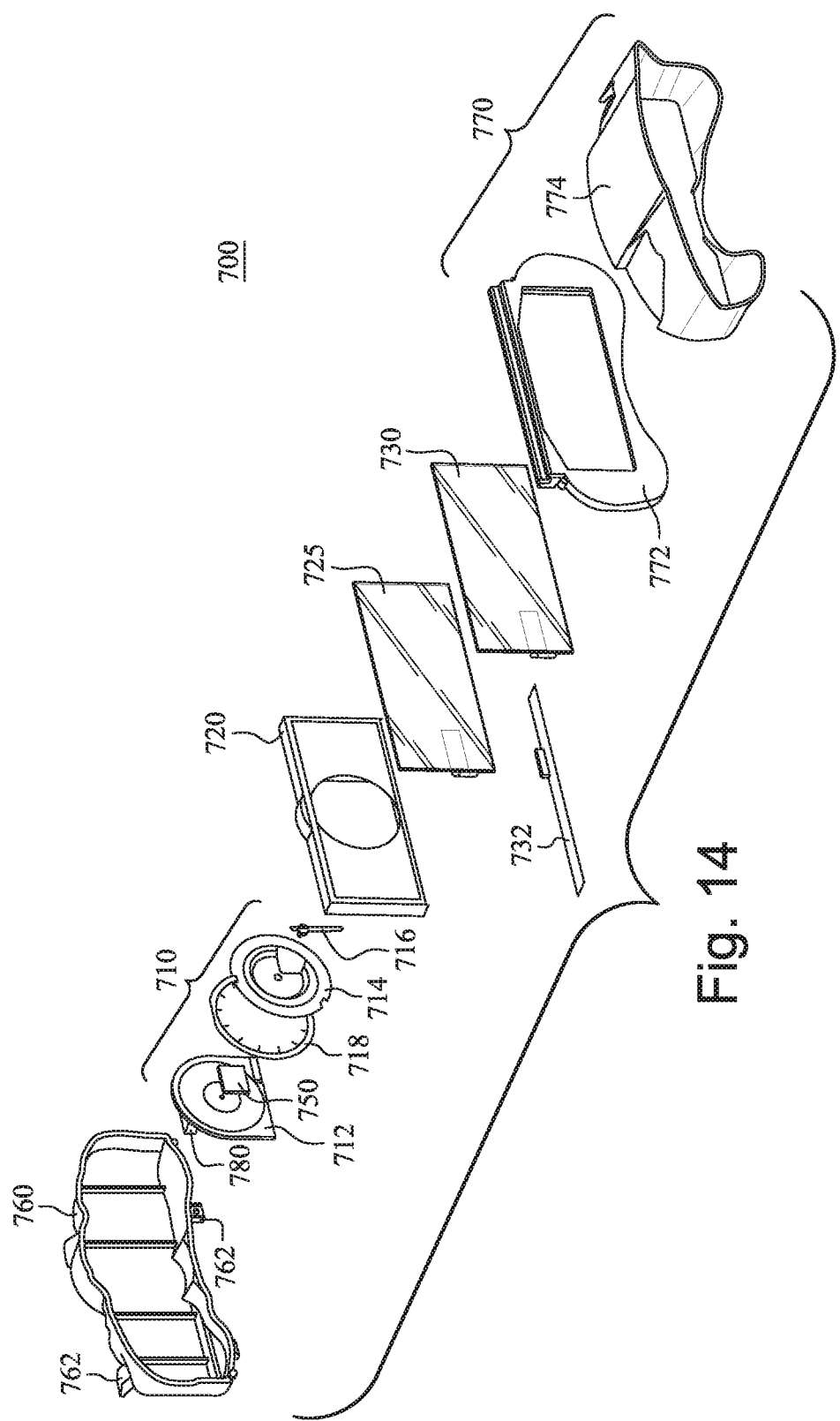

FIGS. 13 and 14 illustrate an instrument panel 700 according to another embodiment of the present disclosure. The instrument panel 700 may be installed in a dashboard of a vehicle. The instrument panel 700 may be configured to display information to an occupant of the vehicle via one or more displays and one or more mechanical indicators provided in the instrument panel 700.

As illustrated in FIGS. 13 and 14, the instrument panel 700 may include an indicator assembly 710, a formed layer 720, an electrochromatic (EC) glass layer 725, a transparent display 710, and/or a multi. The indicator assembly 710 may be provided partially or completely within the formed layer 720. The EC glass layer 725 and the transparent display 730 may be provided in an overlapping manner, and may be positioned such that they overlap the indicator assembly 710 and the formed layer 120. The transparent display 730 may abut the EC glass layer 725.

The instrument panel 700 may also include a first housing 760 and second housing 770. The first housing 760 and the second housing 770 may be configured to detachably engage and to enclose the indicator assembly 710, formed layer 720, the EC glass layer 725, and/or the transparent display 730. The first housing 760 may include a plurality of attachment features 762, such as mounting tabs or other connectors known in the art for securing the instrument panel 700 to the vehicle.

The indicator assembly 710 may include a mechanical structure including a movable component configured to respond to signals received from a processor and/or sensors directly or via a processor. The indicator assembly 710 may include a back panel 712, an information layer with light pipe 714, an applique layer 718, and a pointer 716. The indicator assembly 710 may be configured to be dead-front "dark til lit." Thus, the indicator assembly 710 may have a reduced visibility until it is provided with a signal or power to be made visible. To increase visibility the light pipe 714 may be activated to illuminate the information layer 716 the applique layer 718, and the pointer 716.

The back panel 712 may be printed circuit board (PCB) including a connector for engaging another connector provided in the housing 760 or outside of the housing 760. The PCB may include circuitry and a rear mounted stepper motor 780 for controlling position of the pointer 716 relative to the information provided on the information layer with light pipe 714. The information layer 714 may include information such as numerals on a front surface. The information may be printed on the front surface or attached by other means.

The pointer 714 may overlay the information layer 714. The pointer 716 may be configured to rotate about an axis. The pointer 716 may rotate between a first position and a second position, different from the first position, responsive to received signals. The rotational position of the pointer 716 may be controlled by controlling the motor 780 or other means known to a person of ordinary skill in the art.

The formed layer 720 may be a three-dimensional (3D) formed graphic printed layer including one or more openings for at least a portion of the indicator assembly 710 to be viewed through. The indicator assembly 710 may be provided at least partially within the formed layer 720. At least a portion of the indicator assembly 710 may extend through and past the formed layer 720 (e.g., the pointer 716).

The transparent display 730 may be an LCD display (e.g., LCD with TFT technology) or LED display (inorganic or an organic LED display). The Transparent display 730 may use other technologies, such as OLED, to eliminate the need for a backlight.

The transparent display 730 may allow a user to see what is displayed on the transparent display 730 while still being able to see what is positioned and/or displayed on other displays behind the transparent display 730. The transparent display 730 may be configured to display text, images, and/or video content that is overlays physical object or other display screen(s) positioned behind the transparent display 7.

The EC glass layer 725 may be controlled to alter light transmission properties when voltage and/or light is applied to the EC glass layer 725. The EC glass layer 725 may be a smart glass that is configured to change from opaque to transparent. Thus, the EC glass layer 725 may be controlled to be clear, opaque, or tinted (translucent). The EC glass layer 725 may provide for almost complete blackout of visible light.

An edge light PCB 732 for lighting the transparent display 730 and/or the EC glass layer 725 may be provided on at least one side of the transparent display 730 and/or the EC glass layer 725. The edge light PCB 732 may be turned on to control the EC glass layer 725 to be opaque or translucent. The edge light may also provide light for the transparent display 730 and eliminate the need for a backlight being provided behind the transparent display 730.

Thus, EC glass layer 725 may work as a window blind to hide the physical objects or other display screen(s) positioned behind the EC glass layer 725 or allow them to be viewable via EC glass layer 725 and the transparent display 730. In one embodiment, the EC glass layer 725 may be turned off to allow the physical objects and/or other display screens to be viewable, and may be turned on to reduce the visibility of the physical objects and/or other display screens behind the EC glass layer 725. The transparent display 730 may display content while the EC glass layer 725 is controlled to be transparent or opaque. The EC glass layer 725 may further serve as a diffused backlight for the transparent display 730.

In some embodiments, the transparent display 730 may also be controlled to reduce visibility of physical objects and/or other display screens behind the EC glass layer 725. Content displayed on the transparent display 730 may determine what portion of the transparent display 730 is clear and what portion of the transparent display 730 is opaque. In this embodiment, certain physical objects and/or certain portions of one or more displays behind the transparent display 730 may be hidden while other physical object and/or certain portions of one or more displays behind the transparent display 730 may be visible.

Because ambient light can affect the appearance of transparency, an instrument panel hood 774 may help to reduce the amount of ambient light that reaches the transparent display 730. The instrument panel hood 774 may be provided adjacent to a front housing cover 772. The front housing cover 772 may include an opening for viewing the transparent display 730 and be configured to engage and hold the transparent display 730 in place. The front housing cover 772 may optionally include a protective transparent material to cover the transparent display 730 and/or reduce glare from ambient light.

As illustrated in FIGS. 13 and 14, a second display 750 may be provided behind the transparent display 730. The display 750 may be used to display additional information such as a numeral value of the speed, navigation information, and/or warning. The information displayed on the display 750 may be viewed via the transparent display 730. In some embodiments, the display 750 may display information that corresponds to the information provided by the indicator assembly 710.

FIG. 13 illustrates the display 750 as part of the indicator assembly 710, but is not so limited. The display 750 may be provided in other locations of the instrument panel 700 behind the transparent display 730. For example, a larger display 750 may be provided behind the indicator assembly 710.

The display 750 may include a liquid crystal display (LCD) matrix. Alternatively, the display 750 may include organic light emitting diode (OLED) displays, transparent light emitting diode (TOLED) displays, cathode ray tube (CRT) displays, field emission displays (FEDs), field sequential display or projection displays. In one embodiment, the display 750 may be combinations of either full color RGB, RGBW or monochrome panels. The display 750 is not limited to the listed display technologies and may include other display technologies that allows for the projection of light. In one embodiment, the light may be provided by a projection type system including a light source and one or more lenses and/or a transmissive or reflective LCD matrix. The display 750 may include a multi-layer display unit including multiple stacked or overlapped display layers each configured to render display elements thereon for viewing through the uppermost display layer.

Figure 15:
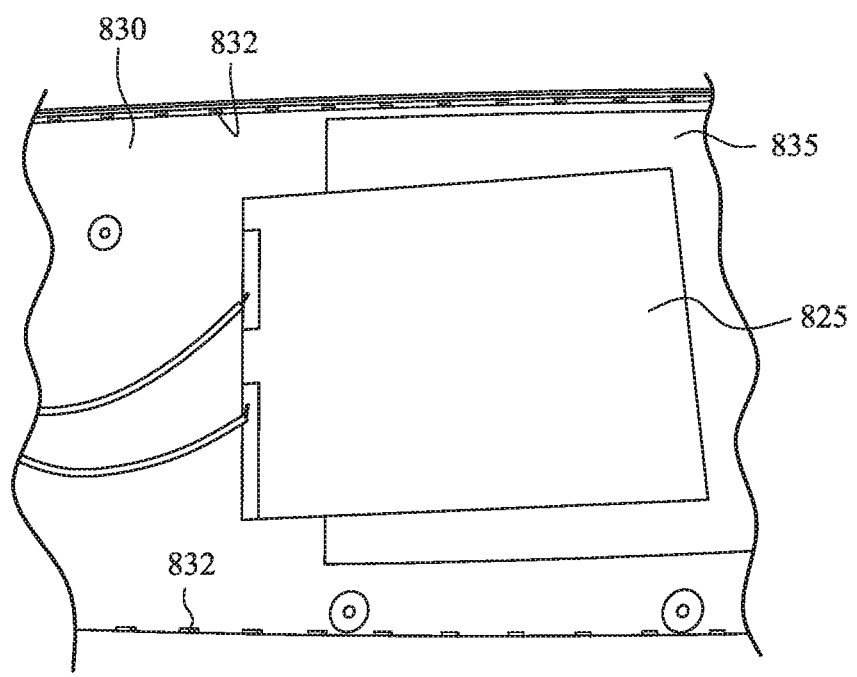
FIG. 15 illustrates an arrangements of electrochromatic (EC) glass according to another embodiment of the present disclosure.

FIG. 15 illustrates an arrangements of electrochromatic (EC) glass 825 according to another embodiment of the present disclosure. As illustrated in FIG. 15, a lightpipe pane 835 may be disposed between a transparent display 830 and the EC glass 825. Edge light LED's in an edge light PCB 832 may provide light for the lightpipe pane 835. The light pipe 835 may be a clear polycarbonate lightpipe.

FIG. 16 illustrates an instrument panel 900 according to another embodiment of the present disclosure. The instrument panel 900 may include a front transparent display 930 and a mechanical indicator assembly 910 provided in housing 960. The transparent display 930 is provided in front of the mechanical indicator assembly 910.

The mechanical indicator assembly 910 may include a pointer 916 configured to rotate about an axis to indicate a numeral value displayed as part of the indicator assembly 910. The mechanical indicator assembly 910 may be a mechanical tachometer or speedometer. A second display 950 may be provided on a surface of the indicator assembly 910.

The instrument panel may optionally include an electrochromatic (EC) glass layer disposed between the mechanical indicator assembly 910 and the transparent display 930. The electrochromatic (EC) glass layer may be controlled to be clear make the indicator assembly 910 and/or other displays positioned behind the indicator assembly 910 visible or opaque to hide the indicator assembly 910 and/or other displays positioned behind the indicator assembly 910. The electrochromatic (EC) glass layer being opaque may also improve the visibility of content displayed on the transparent display 930.

Figure 17A:
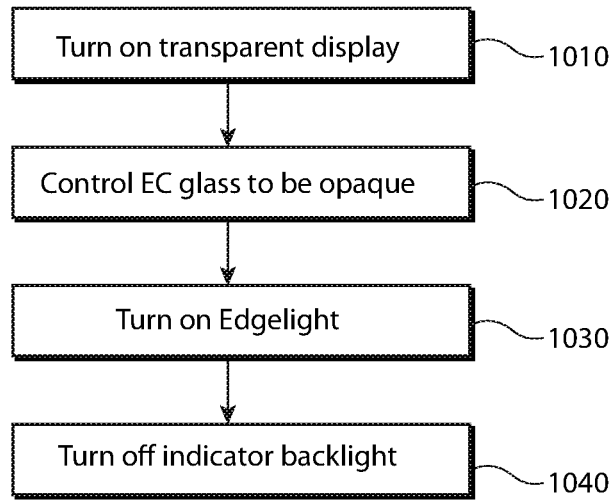
FIGS. 17A and 17B illustrate a method for controlling the display of content according to an embodiment of this disclosure.
Figure 17B:
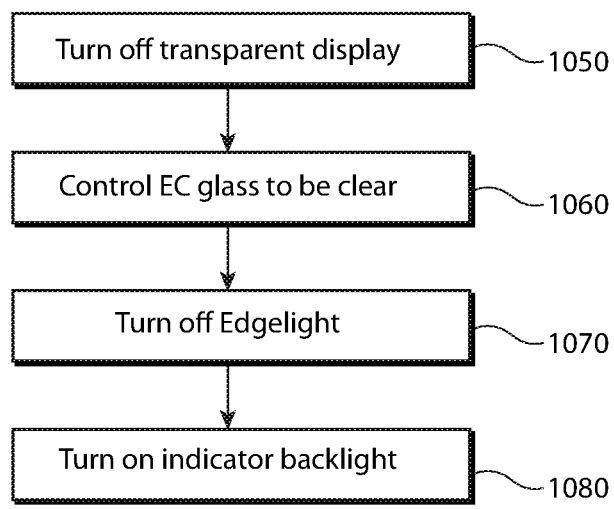

FIGS. 17A and 17B illustrates method for controlling the display of content according to an embodiment of this disclosure. The method for viewing content displayed on a front transparent display and hiding the mechanical indicator assembly (e.g., a mechanical tach) and/or other displays (e.g., a rear LCD) is illustrated in FIG. 17A. The method for viewing content displayed on a displays and/or mechanical indicator assembly behind a front transparent display is illustrated in FIG. 17B.

To view content displayed on the front transparent display and to hide the mechanical indicator assembly (e.g., a mechanical tach) and/or other displays (e.g., a rear LCD) behind the front transparent display, the transparent display is turned on 1010, the EC glass is controlled to be opaque 1020, the edge-light is turned on 1030, and/or the indicator backlight is turned off 1040. Turning on the front transparent display may allow for content to be displayed on the front display. The EC glass may be made opaque by applying a voltage to the EC glass. The edge-light is turned on to allow for the content on the front display to be visible and/or for reduce the transparency of the EC glass. The indicator backlight is provided to illuminate portions of the mechanical indicator and is turned off to reduce the possibility of the indicator being visible to an observer. In some embodiment, other displays and or back lights behind the EC glass may also be turned off.

To view content displayed on a displays and/or mechanical indicator assembly behind a front transparent display, the front transparent display is turned off 1050, the EC glass is controlled to be made clear 1060, the edge-light is turned off 1070, and the indicator backlight it turned on 1080. In some embodiments, content may be displayed on the front trans-parent display while the EC glass is made clear. In this embodiment, the edge-light may be turned on to improve the visibility of the content on the front transparent display.

While the embodiments in this application are described above with reference to an instrument panel of a vehicle, they are not so limited. The embodiments of this application may be applied to other application and device that involve displaying content on a digital display and including a mechanical indicator. For example, the embodiment of this application may be applied to clocks, appliances, or watches.

Figure 18:
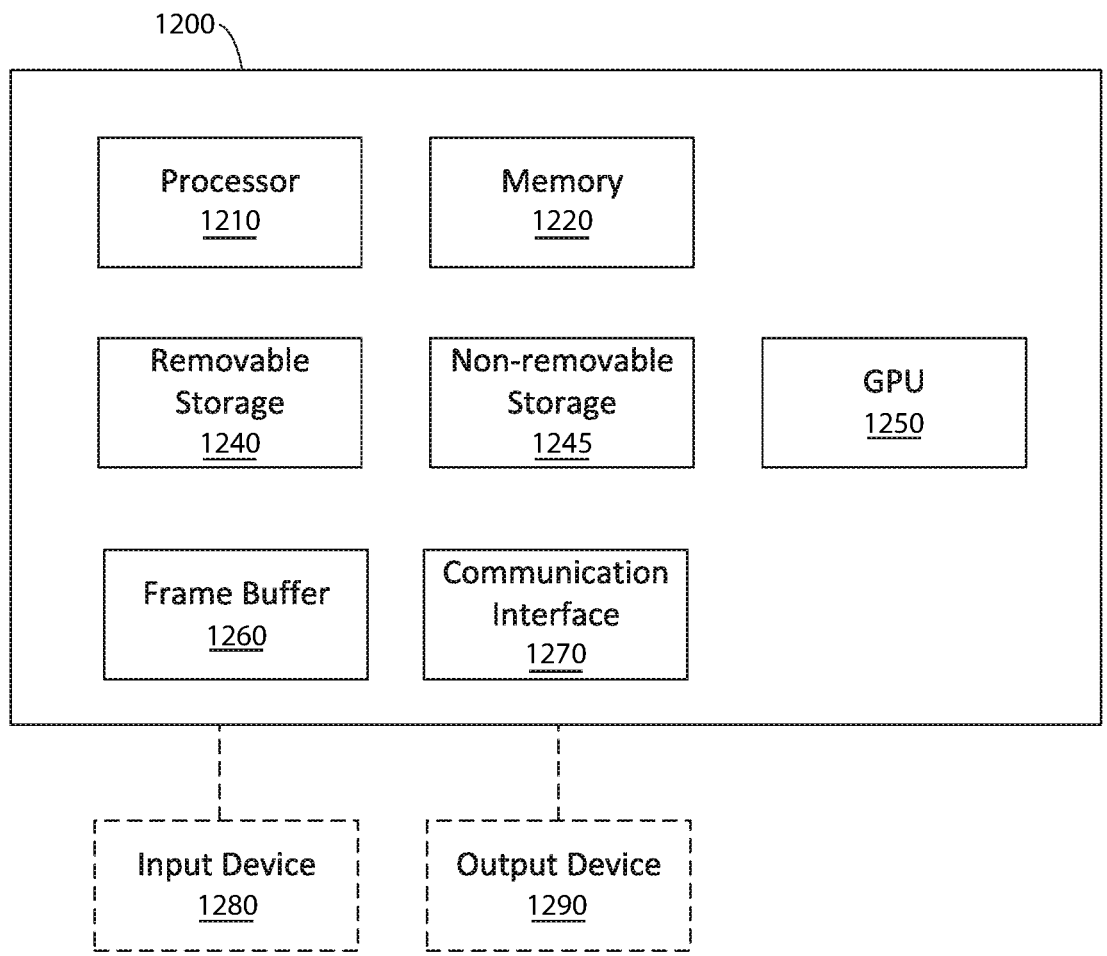
FIG. 18 illustrates an exemplary processing system upon which embodiments of the present disclosure(s) may be implemented.

FIG. 18 illustrates an exemplary processing system 1200 upon which embodiments of the present disclosure(s) may be implemented. The processing system 1200 may include one or more processors 1210 and memory 1220. The processor 1210 may comprise a central processing unit (CPU) or other type of processor. Depending on the configuration and/or type of computer system environment, the memory 1220 may comprise volatile memory (e.g., RAM), non-volatile memory (e.g., ROM, flash memory, etc.), or some combination of the two. Additionally, memory 1220 may be removable, non-removable, etc.

In other embodiments, the processing system may comprise additional storage (e.g., removable storage 1240, non-removable storage 1245, etc.). Removable storage 1240 and/or non-removable storage 1245 may comprise volatile memory, non-volatile memory, or any combination thereof. Additionally, removable storage 1240 and/or non-removable storage 1245 may comprise CD-ROM, digital versatile disks (DVD) or other optical storage, magnetic cassettes, magnetic tape, magnetic disk storage or other magnetic storage devices, or any other medium which can be used to store information for access by processing system 1200.

As illustrated in FIG. 18, the processing system 1200 may communicate with other systems, components, or devices via communication interface 1270. Communication interface 1270 may embody computer readable instructions, data structures, program modules or other data in a modulated data signal (e.g., a carrier wave) or other transport mechanism. By way of example, communication interface 1270 may be couple to wired media (e.g., a wired network, direct-wired connection, etc.) and/or wireless media (e.g., a wireless network, a wireless connection utilizing acoustic, RF, infrared, or other wireless signaling, etc.).

Communication interface 1270 may also couple the processing system 1200 to one or more input devices 1280 (e.g., a keyboard, mouse, pen, voice input device, touch input device, etc.) and/or output devices 1290 (e.g., a display, speaker, printer, etc.). The output devices 1290 may include the displays and/or mechanical indicator assemblies disclosed in this application. The processor 1210 may operate as a controller to control the state and/or operation of components in the instrument panel. For example, the controller may control whether the EC glass layer is opaque or clear, control position of the points, and/or turn on and off back lights and edge lights.

The input devices 1280 may be used by an observer to manipulate the way information is displayed on an output device 1290 and/or what information and/or graphics are displayed in different portion of the output device 1290. In one embodiment, communication interface 1270 may couple the processing system 1200 to a display including three or more display panels arranged in an overlapping manner, and/or a transparent display disposed in an overlapping manner with a mechanical indicator assembly.

As shown in FIG. 18, a graphics processor 1250 may perform graphics/image processing operations on data stored in a frame buffer 1260 or another memory of the processing system. Data stored in frame buffer 1260 may be accessed, processed, and/or modified by components (e.g., graphics processor 1250, processor 1210, etc.) of the processing system 1200 and/or components of other systems/ devices. Additionally, the data may be accessed (e.g., by graphics processor 1250) and displayed on an output device coupled to the processing system 1200. Accordingly, memory 1220, removable storage 1240, non-removable storage 1245, frame buffer 1260, or a combination thereof, may comprise instructions that when executed on a processor (e.g., 1210, 1250, etc.) implement a method of processing data (e.g., stored in frame buffer 1260) for improved display quality on a display.

As shown in FIG. 18, portions of the present invention may be comprised of computer-readable and computer-executable instructions that reside, for example, in a processing system 1200 and which may be used as a part of a general purpose computer network (not shown). It is appreciated that processing system 1200 is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The exemplary embodiments of the present disclosure provide the invention(s), including the best mode, and also to enable a person skilled in the art to practice the invention, including making and using any devices or systems and performing any incorporated methods.

The invention claimed is:

1. An instrument panel comprising;
   a mechanical indicator assembly comprising a magnetized pointer configured to rotate about an axis and thereby define an area swept by the pointer, wherein the magnetized pointer overlies a multilayer display;
   wherein the mechanical indicator assembly further includes a plurality of electromagnets arranged around a circular perimeter of the mechanical indicator assembly, the electromagnets operable to urge the pointer to point in a desired direction;
   a transparent display, different than the multilayer display;
   a housing configured to support the mechanical indicator assembly and the transparent display overlaying the mechanical indicator assembly;
   an electrochromatic (EC) layer disposed between the mechanical indicator assembly and the transparent display, wherein the transparent display is configured to be provided between the magnetized pointer and a viewer of the instrument panel,
   wherein the EC layer is configured to be a diffused backlight for the transparent display, and
   a control system, comprising a controller, configured to selectively display, on the transparent display, content including text and/or graphics and to selectively control the transparency of the EC layer via application of voltage thereto in order to selectively hide the pointer from the viewer, and wherein the EC layer is located between the transparent display and the pointer.

2. The instrument panel according to claim 1, wherein the control system is further configured to display, on the transparent display, graphics to at least partially reduce the visibility of the mechanical indicator assembly positioned behind the transparent display.

3. The instrument panel according to claim 1, wherein the displayed text and/or graphics are displayed in a portion of the transparent display overlapping the mechanical indicator assembly.

4. The instrument panel according to claim 1, wherein the control system is further configured to display, on the multilayer display, content corresponding to operation of a vehicle.

5. The instrument panel according to claim 1, wherein the multilayer display is disposed between the mechanical indicator assembly and the transparent display.

6. The instrument panel according to claim 1, wherein the multilayer display includes a multi-layer display system including a plurality of display screens arranged in a substantially parallel and overlapping manner, and the multi-layer display system is positioned behind the mechanical indicator assembly.

7. The instrument panel according to claim 1, wherein the mechanical indicator assembly includes (1) a ring with gear teeth provided on an outside surface of the ring and the pointer extending from an inside surface of the ring and towards the center of the ring, and (2) a motor with a drive gear configured to engage the teeth on the ring for controlling the rotational position of the pointer.

8. The instrument panel according to claim 1, wherein the control system is configured to:
   apply voltage to the EC layer to hide the mechanical indicator assembly behind the EC layer; and
   remove voltage applied to the EC layer to make the mechanical indicator assembly behind the EC layer visible.

9. The instrumental panel according to claim 1, further comprising a mechanical indicator backlight configured to provide light to the mechanical indicator assembly.

10. The instrument panel according to claim 1, wherein the control system is configured to:
    when content is displayed on the transparent display, control light transmission properties of the EC layer to make the EC layer opaque; and
    when content is not displayed on the transparent display, control light transmission properties of the EC layer to make the EC layer clear.

\* \* \* \* \*